United States Patent
Iwamura

(10) Patent No.: US 7,630,401 B2
(45) Date of Patent: Dec. 8, 2009

(54) BANDWITH MANAGEMENT IN A NETWORK

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 764 days.

(21) Appl. No.: 11/271,038

(22) Filed: Nov. 12, 2005

(65) Prior Publication Data
US 2006/0245355 A1    Nov. 2, 2006

Related U.S. Application Data

(60) Provisional application No. 60/675,592, filed on Apr. 28, 2005, provisional application No. 60/693,650, filed on Jun. 24, 2005.

(51) Int. Cl.
*H04L 12/26* (2006.01)
*H04L 12/40* (2006.01)

(52) U.S. Cl. ...................... 370/468; 370/477

(58) Field of Classification Search ............... 370/468, 370/477, 229, 230, 232, 236, 458, 461, 462
See application file for complete search history.

(56) References Cited

U.S. PATENT DOCUMENTS

| | | | |
|---|---|---|---|
| 4,815,106 A | 3/1989 | Propp | |
| 5,463,620 A * | 10/1995 | Sriram | ........................ 370/412 |
| 5,625,863 A | 4/1997 | Abraham | |
| 6,157,292 A | 12/2000 | Piercy | |
| 6,412,112 B1 | 6/2002 | Barrett | |
| 6,417,762 B1 | 7/2002 | Comer | |
| 6,566,889 B2 | 5/2003 | Warke | |
| 6,608,552 B1 | 8/2003 | Fogel | |
| 6,625,119 B1 * | 9/2003 | Schuster et al. | ............. 370/230 |
| 6,822,555 B2 | 11/2004 | Mansfield | |
| 6,834,091 B2 | 12/2004 | Litwin | |
| 6,854,059 B2 | 2/2005 | Gardner | |
| 6,894,973 B1 * | 5/2005 | Mishra | ........................ 370/229 |
| 6,897,764 B2 | 5/2005 | Cern | |
| 6,947,409 B2 | 9/2005 | Iwamura | |
| 6,947,736 B2 | 9/2005 | Shaver | |
| 6,950,010 B2 | 9/2005 | Aisa | |
| 6,965,302 B2 | 11/2005 | Mollenkopf | |
| 7,359,004 B2 * | 4/2008 | Yu et al. | ................... 348/390.1 |
| 2002/0039388 A1 | 4/2002 | Smart | |

(Continued)

OTHER PUBLICATIONS http://www.homeplug.org.

(Continued)

*Primary Examiner*—Min Jung
(74) *Attorney, Agent, or Firm*—Fitch, Even, Tabin & Flannery

(57) ABSTRACT

A method, in accordance with one embodiment, for adjusting a transmission rate of a network device for a transmission based upon network bandwidth utilization on a network comprising transmitting a data stream at a current transmission rate utilizing a first bandwidth allocation; receiving a transmission rate recovery request from a master device on the network; receiving an additional bandwidth allocation from the master device on the network when the current transmission rate is less than an original transmission rate; and transmitting the data stream at an increased transmission rate utilizing a total bandwidth allocation, the total bandwidth allocation including the additional bandwidth allocation and the first bandwidth allocation.

36 Claims, 19 Drawing Sheets

U.S. PATENT DOCUMENTS

| | | | |
|---|---|---|---|
| 2002/0080816 A1* | 6/2002 | Spinar et al. | 370/449 |
| 2002/0089928 A1* | 7/2002 | Morikawa et al. | 370/229 |
| 2003/0006881 A1 | 1/2003 | Reyes | |
| 2003/0045970 A1 | 3/2003 | Maryanka | |
| 2003/0067872 A1* | 4/2003 | Harrell et al. | 370/229 |
| 2004/0003338 A1 | 1/2004 | Kostoff | |
| 2004/0008726 A1* | 1/2004 | Kelly et al. | 370/468 |
| 2005/0120128 A1 | 6/2005 | Willes | |
| 2005/0169056 A1 | 8/2005 | Berkman | |
| 2006/0034330 A1 | 2/2006 | Iwamura | |
| 2006/0209898 A1* | 9/2006 | Abdelilah et al. | 370/477 |
| 2006/0221820 A1* | 10/2006 | Zeitak | 370/229 |
| 2007/0165524 A1* | 7/2007 | Mascolo | 370/230 |

OTHER PUBLICATIONS http://www.intellon.com.

"Digital Cable Network Interface Standard", *American National Standard, ANSI/SCTE 40* 2004 Society of Cable Telecommunications Engineers 2004.

"Digital Multiprogram Distribution By Satellite", *American National Standard, ANSI/SCTE 56* 2004 (formerly DVS 071) Society of Cable Telecommunications Engineers 2004.

"IEEE Trial-Use Standard for Measurement of Video Jitter and Wander", *IEEE Std 1521 2003* IEEE Standards Feb. 6, 2004.

"Information Technology—Generic coding of moving pictures and associated audio information", *ISO/IEC 13818-6:1998/Amd. 1:2000(E)* Oct. 15, 2000.

"Standards Australia/Standards New Zealand", *Amendment No. 1 to AS/NZS 13818.6:1999 Information technology—Generic coding of moving pictures and associated audio information* Dec. 2, 2002.

"Uni-Directional Receiving Device Standard for Digital Cable", *American National Standard, ANSI/Scte 105* 2005 Society of Cable Telecommunications Engineers 2005.

* cited by examiner

BANDWITH MANAGEMENT IN A NETWORK

This application claims priority to and is a non-provisional application of U.S. Provisional Patent Application No. 60/675,592, filed Apr. 28, 2005, entitled FLEXIBLE AND FAIR BANDWIDTH MANAGEMENT FOR HOME NETWORK.

This application also claims priority to and is a non-provisional application of U.S. Provisional Patent Application No. 60/693,650, filed Jun. 24, 2005, entitled FLEXIBLE AND FAIR BANDWIDTH MANAGEMENT FOR HOME NETWORK.

BACKGROUND OF THE INVENTION

1. Field of the Invention

The present invention relates to bandwidth management in networks. More specifically, the present invention relates to bandwidth management in powerline home networks.

2. Discussion of the Related Art

Powerline communication (PLC) is expected to be increasing as a viable backbone for home networks. The first generation of PLC products, for example, HomePlug 1.0 (www.homeplug.org), are already widely used. Currently, the second generation PLC product for Audio/Video streaming are under development and will be capable of carrying a plurality of MPEG2-HD streams. The second generation PLC network has a greater bandwidth capacity than the first generation PLC; however, even the bandwidth available is not large enough for all applications. For example, the bandwidth may be limited when a powerline is shared with neighbor. Therefore, bandwidth sharing on the powerline network is an important issue. In a shared network, if a neighbor begins to send a high bit rate stream, most of the bandwidth for the network is used up, the network speed will slow down significantly, and possible no more bandwidth for additional transmissions will be available.

SUMMARY OF THE INVENTION

Some embodiments described herein utilize flexible bandwidth control in order to solve the problem of limited bandwidth. In one embodiment, when the powerline network gets busy, the encoding rate of an existing data stream is reduced and some of the assigned bandwidth (e.g., timeslots) is released to increase the available bandwidth for a second data stream. The existing data stream does not intermit during this process in accordance with some embodiments. When network traffic is reduced, the bandwidth (e.g., timeslots) is reassigned for the existing stream. In accordance with some embodiments this enables the encoding rate to be increased to the original rate without intermittence of the data stream. Moreover, by assigning more timeslots to the stream, more robust modulation schemes can be used for stable and error-free transmission.

One embodiment can be characterized as a method for adjusting a transmission rate of a network device for a transmission based upon network bandwidth utilization on a network comprising transmitting a data stream at a current transmission rate utilizing a first bandwidth allocation; receiving a transmission rate recovery request from a master device on the network; receiving an additional bandwidth allocation from the master device on the network when the current transmission rate is less than an original transmission rate; and transmitting the data stream at an increased transmission rate utilizing a total bandwidth allocation, the total bandwidth allocation including the additional bandwidth allocation and the first bandwidth allocation.

Another embodiment can be characterized as a method for adjusting a transmission rate of a transmission for a network device on a network comprising receiving at the network device an allocation of additional bandwidth from a master device on the network; and assigning data from a transmission to be transmitted in a total bandwidth allocation to the network device including the additional bandwidth allocation and a first bandwidth allocation.

A subsequent embodiment includes a method for a master device on a network to allocate bandwidth to network devices associated to the master device on the network comprising receiving a request for bandwidth from a network device; determining whether the master device has sufficient unutilized bandwidth allocated to it such that the master device could allocate the bandwidth to the network device requesting the bandwidth; sending a reduce bandwidth request to the network devices associated with the master device on the network where the unutilized bandwidth allocated to the master device is insufficient to allocate the bandwidth requested by the network device; receiving at least one bandwidth allocation from at least one of the network devices on the network; and allocating bandwidth to the network device from the bandwidth allocations to the master device from the devices on the network.

Yet another embodiment includes a method for a first master device on a network to allocate bandwidth to network devices associated to the first master device on the network comprising receiving a request for bandwidth from a network device associated with the first master device; requesting additional bandwidth from a second master device on the network when the first master device does not have sufficient bandwidth allocation to allocate the requested bandwidth to the network device; receiving additional bandwidth from the second master device on the network; and allocating the additional bandwidth to the network device from which the request for bandwidth was received.

Another embodiment can be characterized as a shared network having fair and flexible bandwidth management comprising a plurality of master devices, wherein each master device is allocated a portion of a total amount of bandwidth available on the shared network; and at least one transmitter device associated with each of the plurality of master devices, wherein each transmitter is assigned bandwidth for a transmission of a data stream from one of the plurality of master devices, wherein each transmitter is assigned bandwidth from the master device associated with the transmitter; wherein each of the plurality of master devices coordinates with the other master devices the control over the use of the total amount of bandwidth available.

BRIEF DESCRIPTION OF THE DRAWINGS

The above and other aspects, features and advantages of the present invention will be more apparent from the following more particular description thereof, presented in conjunction with the following drawings, wherein.

Figure 1:
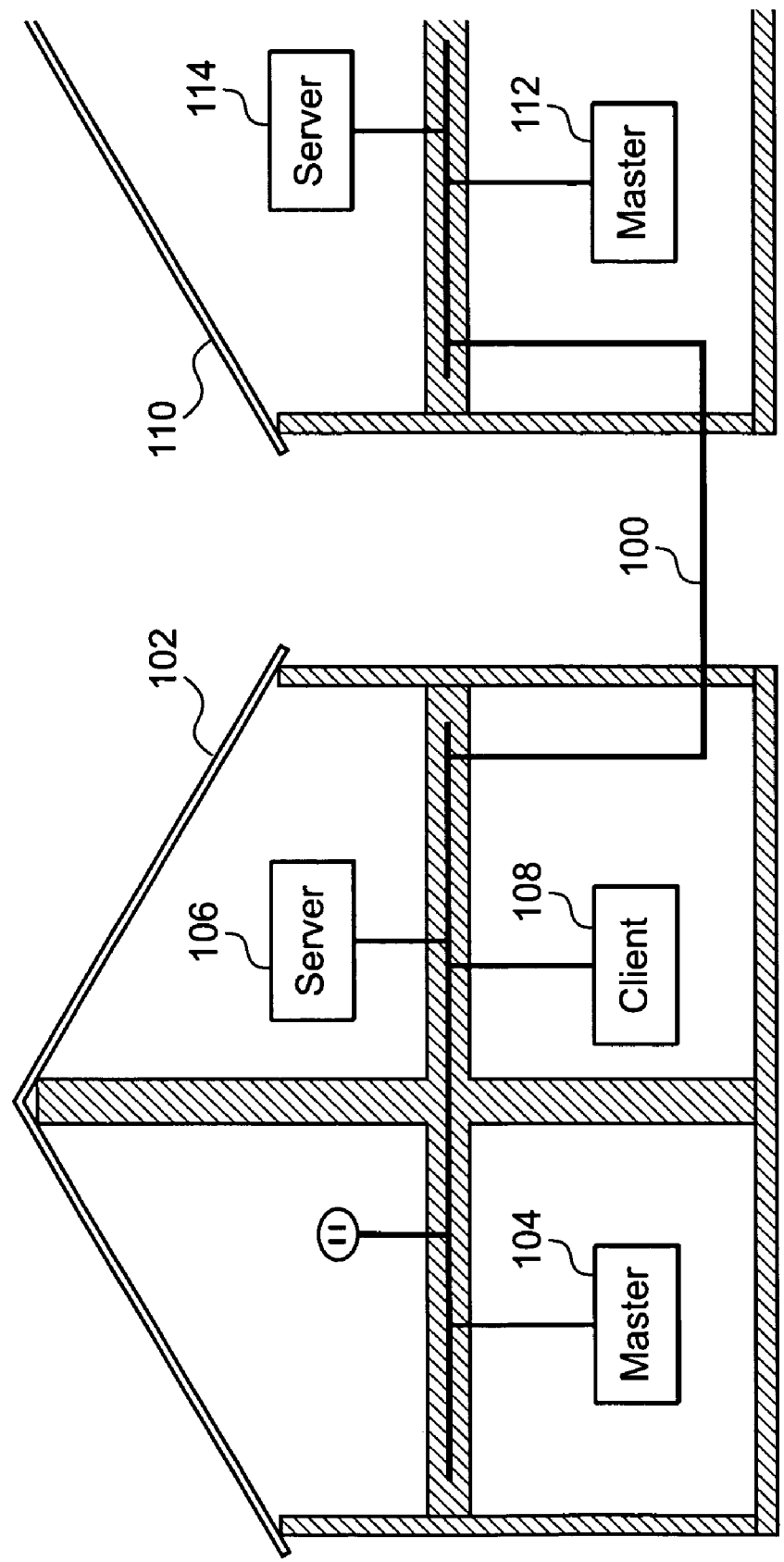
FIG. 1 is a system diagram illustrating a home network in accordance with one embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

The following description is not to be taken in a limiting sense, but is made merely for the purpose of describing the general principles of the invention. The scope of the invention should be determined with reference to the claims. The present embodiments address the problems described in the background while also addressing other additional problems as will be seen from the following detailed description.

Referring to FIG. 1, a system diagram is shown illustrating a home network in accordance with one embodiment. Shown is a powerline network 100, a first home 102, a first master 104, a first server 106, a first client 108, a second home 110, a second master 112 and a second server 114.

The first master 104, the first server 106 and the first client 108 are all connected to the powerline network 100 and form a first local network. The second master 112 and the second server 114 are also connected to the powerline network 100 and form a second local network. Each of the local networks can include a larger or smaller number of devices; however, for simplicity in demonstrating aspects of the present embodiments, the powerline network 100 is shown with few devices connected. Additionally, the powerline network 100 can include more or less than two master devices. Each master device (e.g., the first master 104 and the second master 112) controls a separate local network; however, the resources (e.g., bandwidth) of the powerline network 100 are shared between the master devices.

As described, the powerline network 100 is shared between the first home 102 and the second home 110. While not shown, different numbers of homes (e.g., between 1 and 6 homes) can co-exists on the powerline network in accordance with some embodiments. Additionally, while some embodiments described herein are referred to as homes, other types of structures (e.g., apartments or businesses) can also share the powerline network 100. In the present embodiment, each home connected to the powerline network 100 has at least one master (e.g., the first master 104 and the second master 112). The master device can be a dedicated master or the functions performed by the master device can be transferred between devices (See for example, U.S. patent application Ser. No. 11/231,488, filed Sep. 20, 2005, to Iwamura et al., entitled POWER-SAVE CONTROL FOR NETWORK MASTER DEVICE, which is incorporated herein by reference in its entirety). The first master 104 and the second master 112 each establish the local network, manage the allocated bandwidth or their local network and collectively manage the total bandwidth of the powerline network 100.

In operation, before the first sever 106 on the powerline network 100 sends a data stream to the client 108, the server 106 requests the master 104 to allocate bandwidth (e.g., one or more timeslots) for the transmission of the data stream. That is, the server 106 sends a bandwidth request to the master 104. The allocation of bandwidth varies depending upon the type of communication standard that is being utilized. As described herein, the powerline network utilizes TDMA (Time Division Multiplexing Access) in accordance with one embodiment. After the first master 104 allocates the bandwidth (e.g., timeslots in a TDMA system) the server 106 starts transmitting the data stream to the client 108.

As described above, each local network includes a master (e.g., the first master 104 and the second master 112). The master devices communicate with each other and, as will be described herein below, negotiate bandwidth (e.g., timeslots) for the transmission of data streams within their local network. As described in U.S. patent application Ser. No. 11/231,488, filed Sep. 20, 2005, to Iwamura et al., entitled POWER-SAVE CONTROL FOR NETWORK MASTER DEVICE, the master does not have to be an independent device, but can be any device capable of carrying out various functions (e.g., beacons) performed by the master. The device that is acting as the master device can change within the local network. That is, the master is, for example, the server or the client in some embodiments and the master functions can be transferred between different devices connected to the powerline network 100. The master device is aware of each transmission performed on its local network and is responsible for sending beacons for the transmissions.

In some embodiments, the powerline network utilizes OFDM (Orthogonal Frequency Division Multiplexing) and TDMA (Time Division Multiplexing Access) for the transfer of data. OFDM uses, for example, 1000 sub-carriers ranged from 1 to 30 MHz. Based on signal-to-noise ratio (SNR), the best modulation scheme is applied each sub-carrier. When the SNR is poor, a robust modulation, for example, QPSK (Quadrature Phase Shift Keying) is applied. When the SNR is good, QAM (Quadrature Amplitude Modulation) can be used. A modulation table (i.e., tone map) is frequently exchanged between a transmitter (e.g., the server 106) and a receiver (e.g., the client) to optimize transmission of the data stream.

Figure 2:
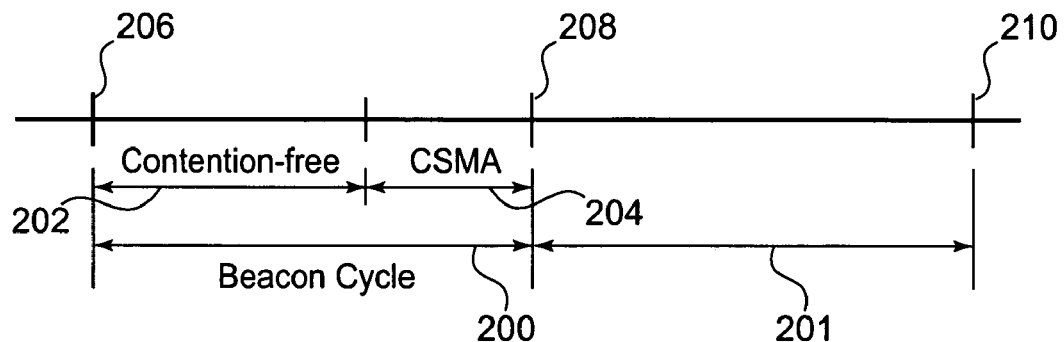
FIG. 2 is a timing chart illustrating network access timing in accordance with one embodiment.

Referring to FIG. 2, a timing chart is shown illustrating network access timing in accordance with one embodiment. Shown is a first beacon cycle 200, a second beacon cycle 201, a contention-free area 202, a Carrier Sense Multiple Access (CSMA) area 204, a first beacon 206, a second beacon 208 and a third beacon 210.

A master device in the powerline network 100 periodically sends a beacon (e.g., the first beacon 206, the second beacon 208 and the third beacon 210) to all other devices. The first beacon cycle 200 is divided into the contention-free area 202 and the CSMA (Carrier Sense Multiple Access) area 204. Each beacon cycle contains both a contention-free area and a CSMA area. The CSMA area 204 is a contention area. That is, devices send data in the CSMA area on first-come-first-serve basis. Therefore, even if a timeslot is obtained for a beacon cycle, there is no guarantee the time-slot will be available for the next beacon cycle. The contention-free area 202 is used, for example, for jitter-sensitive audio/video (AV) streaming in accordance with some embodiment described herein.

Figure 3:
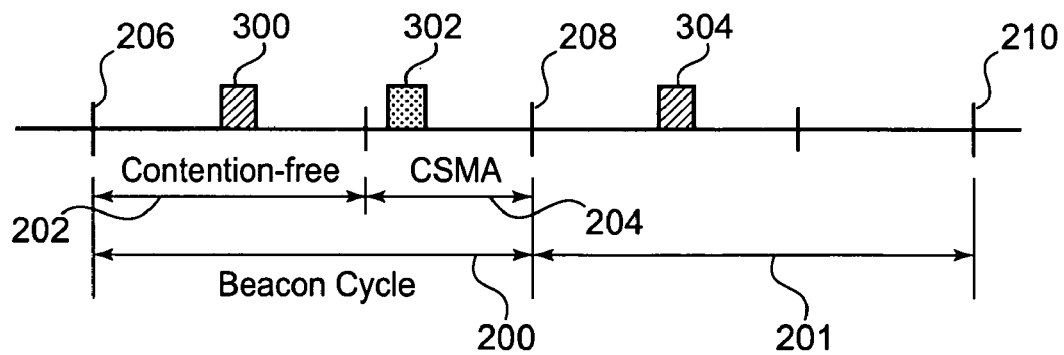
FIG. 3 is a timing chart illustrating transfer of a data stream in an assigned timeslot.

Referring to FIG. 3, a timing chart is shown illustrating transfer of a data stream in an assigned timeslot. Shown is the first beacon cycle 200, the second beacon cycle 201, the contention-free area 202, the CSMA area 204, the first beacon 206, the second beacon 208, the third beacon 210, a first timeslot 300 in the first beacon cycle 200, a second timeslot 302 in the first beacon cycle 200 and a third timeslot 304 in the second beacon cycle 201.

A transmitter (e.g., the first server 106 shown in FIG. 1) sends a bandwidth request to the first master 104, receives a timeslot assignment (e.g., the first timeslot 300), and starts transmitting a data stream utilizing the first timeslot 300 in the first beacon cycle 200 and the third timeslot 304 in the second beacon cycle 201. As shown, the same timeslot is reserved for the data stream every beacon cycle, unless a new timeslot is assigned by the master (described herein below). In preferred embodiments, when transferring data streams the contention-free area 202 is utilized.

The CSMA area 204 is used for asynchronous transmission (ex. file transfer, commands, etc.). Data is transferred utilizing the second timeslot 302 in the first beacon cycle 200.

Figure 4:
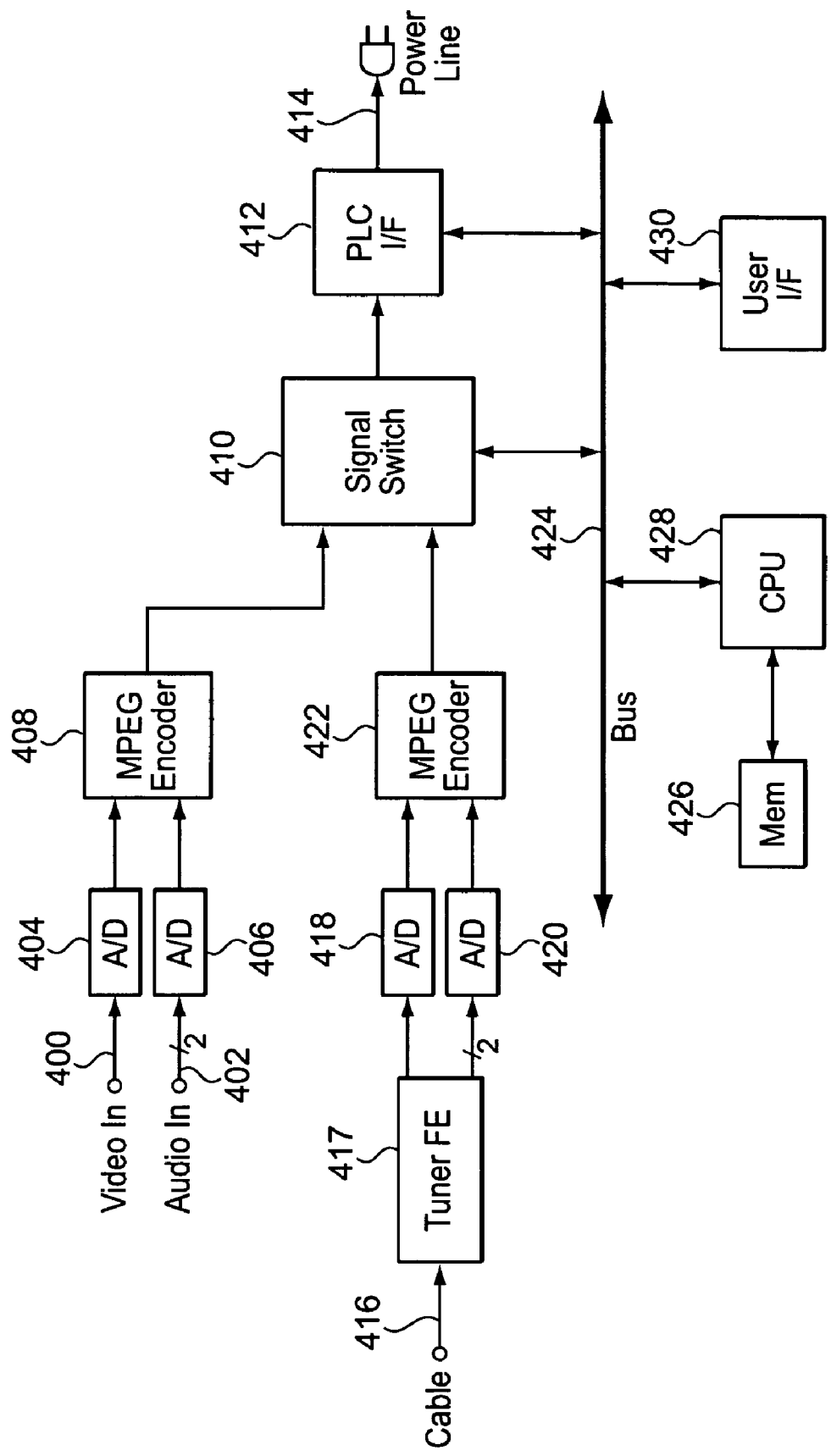
FIG. 4 is a block diagram illustrating the server in accordance with an exemplary embodiment.

Referring next to FIG. 4, a block diagram is shown illustrating the server 106 in accordance with an exemplary embodiment. Shown is a video input 400, an audio input 402, a first analog to digital (A/D) converter 404, a second A/D converter 406, a first encoder 408, a signal switch 410, a powerline communication interface 412, a power line network 414, a cable input 416, a tuner/front end 417, a third A/D converter 418, a fourth A/D converter 420, a second encoder 422, an internal bus 424, a memory 426, a controller 428 and a user interface 430.

An analog signal from the cable input 416 is tuned and demodulated by the front-end tuner 417. The front-end tuner 417 outputs an audio/video signal which is input into the third A/D converter 418 and the fourth A/D converter 420. The output from the third A/D converter 418 and the fourth A/D converter 420 is then encoded in the second encoder 422 (e.g., an MPEG encoder). The output stream from the second encoder 422 is sent to signal switch 410.

Similarly, the video input 400 and the audio input 402 are analog-digital converted in the first A/D converter 404 and the second A/D converter 406. The output from the first A/D converter 404 and the second A/D converter 406 encoded in the first Encoder 408 (e.g., an MPEG encoder). The output from the first MPEG Encoder 408 is also sent to the signal switch 410. The signal switch 410 sends a selected stream (e.g., the A/V input or the cable input) to the powerline communication interface (PLC I/F) 412. Alternatively, the signal switch 410 may time-multiplex both input signals to simultaneously transmit two both streams. The output signal from the PLC I/F 412 is sent over the powerline network 414 to a client.

The controller 428 (shown in FIG. 4 as CPU 428) controls all the components of the server by utilizing the internal bus 424. The internal bus 424 is, for example, a PCI bus. The controller 428 runs a control software program stored in the memory 426 of the server. The user interface 430 includes, for example, a display and input means (e.g., buttons, touch screen, etc.). The user interface 430 sends a command input by the user to the controller 428. Additionally, the user interface 430 receives data from the controller 428 and displays information on the display of the user interface 430.

Figure 5:
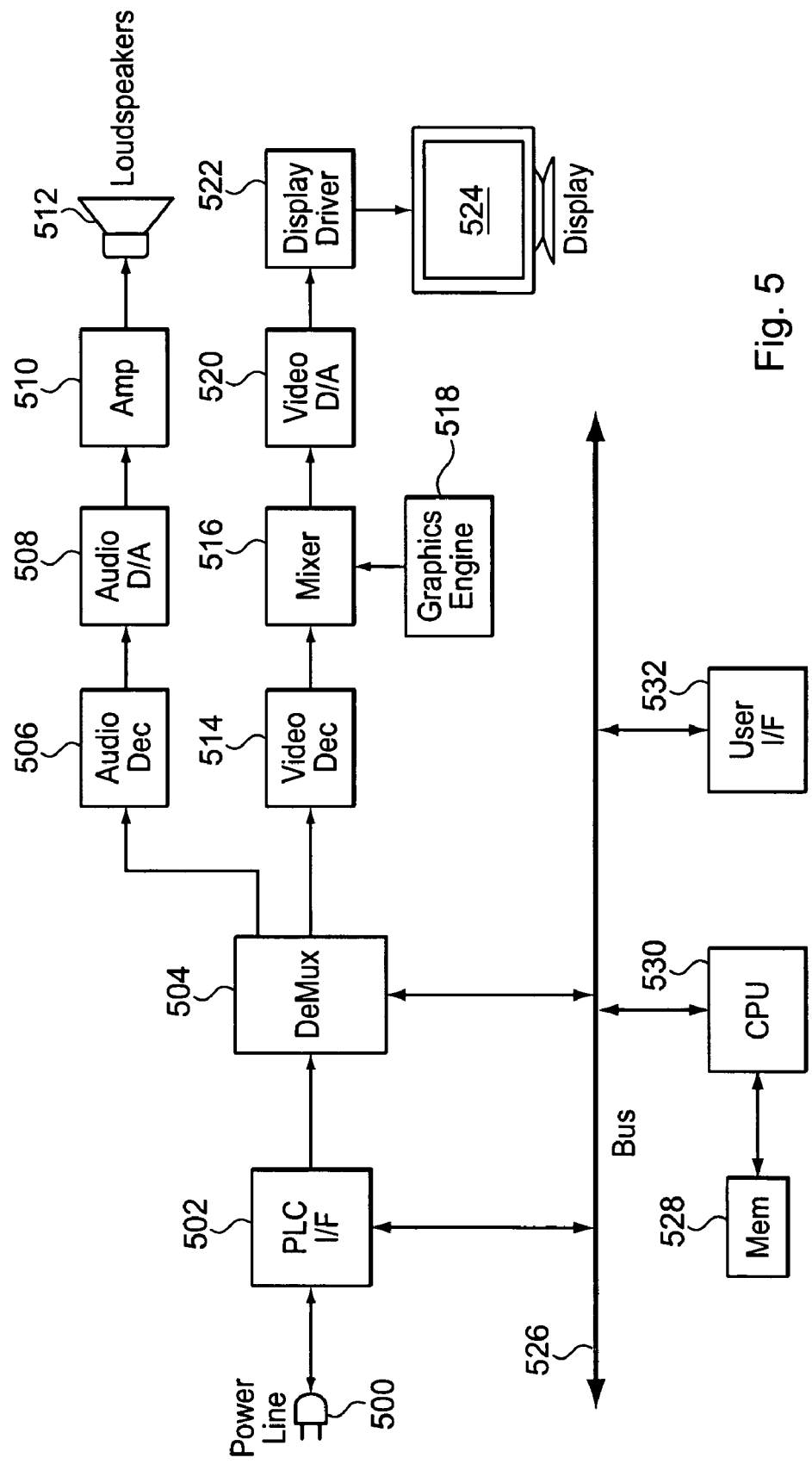
FIG. 5 is a block diagram illustrating the client in accordance with an exemplary embodiment.

Referring next to FIG. 5, a block diagram is shown illustrating the client 108 in accordance with an exemplary embodiment. Shown is a power line network 500, a powerline communication interface (PLC I/F) 502, a de-multiplexer 504, an audio decoder 506, an audio digital to analog (D/A) converter 508, an amplifier 510, speakers 512, a video decoder 514, a mixer 516, a graphics engine 518, a video D/A converter 520, a display driver 522, a display 524, an internal bus 526, a memory 528, a controller 530 and a user interface 532.

The PLC I/F 502 receives a signal from the server (e.g., the server shown in FIG. 4) that is sent over the power line network 500. An output signal from the PLC I/F 502 is sent to the de-multiplexer 504 which separates the output signal from the PLC I/F 502 into audio data and video data. The video data is sent to the video decoder 514. In the mixer 516 decoded video signals from the video decoder 514 are mixed with graphics data generated in the graphics engine 518. The output from the mixer 516 is sent to the video D/A converter 520.

The analog output from the video D/A converter 520 is sent to display driver 522 and subsequently displayed on the display 524.

Similarly, audio data from the de-multiplexer 504 is decoded in the audio decoder 506 converted into an analog signal in the audio D/A converter 508. The analog output from the audio D/A converter 508 is amplified by the amplifier 510 and sent to speakers 512.

The controller 530 (shown in FIG. 4 as CPU 530) exchanges asynchronous data (e.g., commands, data, etc.) with the controller 428 in the server (shown in FIG. 4) over the powerline network 500. The controller 530 controls all the component of the client device through the internal bus 526. Additionally, the controller 530 runs a control software program stored in the memory 528 of the client. The user interface 532 includes, for example, inputs and an infrared remote signal receiver. The user interface 532 sends a command from the user to the controller 530.

Figure 6:
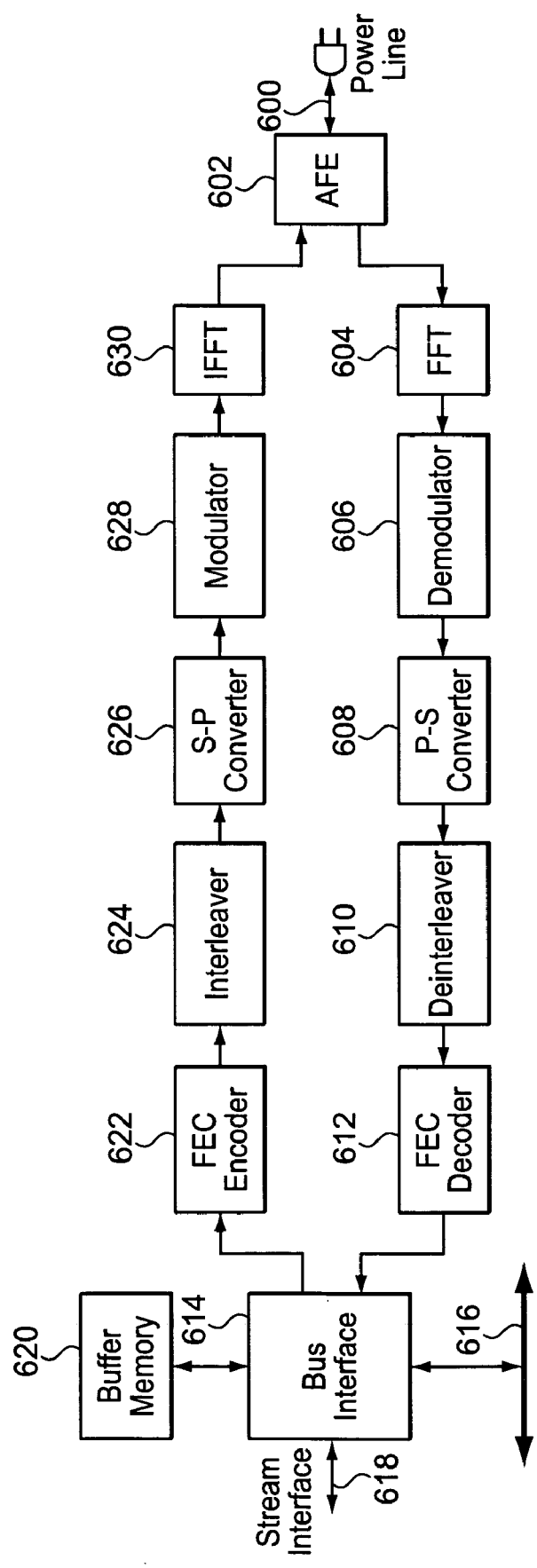
FIG. 6 is a block diagram illustrating a powerline communication interface in accordance with an exemplary embodiment.

Referring to FIG. 6 a block diagram is shown illustrating a powerline communication interface 412 or 502 in accordance with an exemplary embodiment. Shown is a powerline network 600, an analog front-end (AFE) circuit 602, a Fast Fourier Transform (FFT) circuit 604, a demodulator 606, a parallel to serial (P-S) converter 608, a de-interleaver 610, a forward error correction (FEC) decoder 612, a bus interface 614, an internal bus 616, a stream interface 618, a memory 620, a FEC encoder 622, an interleaver 624, a serial to parallel (S-P) converter 626, a modulator 628 and an Inverse Fast Fourier Transform (IFFT) circuit 630.

Data (e.g., a data stream) that is transmitted over the powerline network is received by the bus interface 614 from the internal bus 616 and temporarily stored in the memory 620. The memory is, for example, a buffer memory. The internal bus 616 is, for example, the internal bus 424 of the server shown in FIG. 4. The data is then read from the memory 620 and error correction code is added to the data in the FEC encoder 622. The data is then output from the FEC encoder 622 to the interleaver 624 and the S-P Converter 626. The parallel signals from the S-P converter are then modulated by the modulator 628 and sent to the IFFT circuit 630. A modulation scheme is selected for each sub-carrier, for example, based on a tone map that is exchanged with a receiver that the data is being transmitted to. In the IFFT circuit 630, a carrier is assigned to each input signal and all the signals are inversely fast-Fourier-transformed. The output from the IFFT circuit 630 is sent to the AFE circuit 602 and sent over the powerline network 600 to the receiver.

When receiving data, the data is processed in the reverse direction. First, the AFE 602 receives data (e.g., a data stream) from a transmitting device (e.g., the server 106 shown in FIG. 1) over the power line 600. In this example, the PLC interface is the PLC I/F 502 shown in FIG. 5. The data is fast-Fourier-transformed by the FFT circuit 604, demodulated by the demodulator 606 and parallel-serial converted by the P-S converter 608. The demodulation is performed for each sub-carrier based on a tone map that is exchanged with the transmitter. The output from the P-S converter is sent to the de-interleaver 610 which in turn sends the data to on to the FEC decoder 612. The output from the FEC decoder 612 is sent to the bus interface 614. The data is temporarily stored in the memory 620 before being sent to the internal bus 616. The PLC Interface can simultaneously transmit and receive data. Additionally, the PLC interface shown in FIG. 6 functions in the same manner for both the PLC interface located in a server and in a client.

Figure 7:
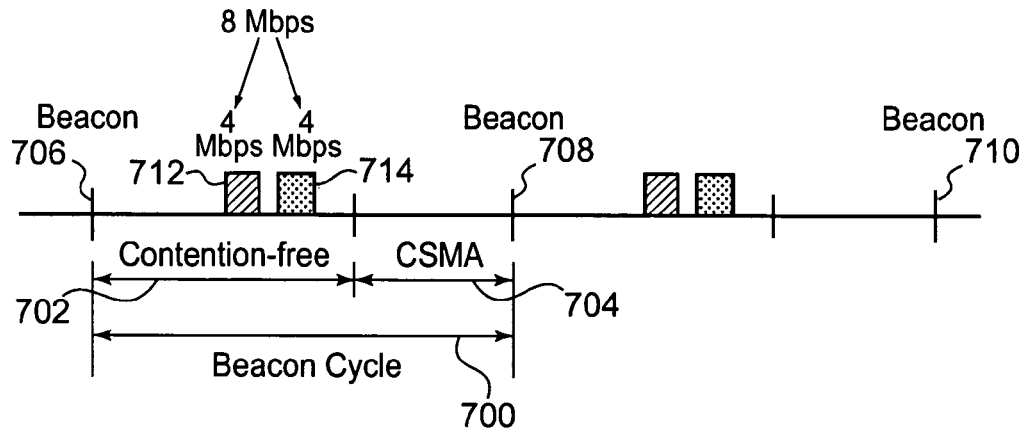
FIG. 7 is a timing diagram illustrating splitting a data stream into multiple timeslots in accordance with one embodiment.

Referring next to FIG. 7, a timing diagram is shown illustrating splitting a data stream into multiple timeslots in accordance with one embodiment. Shown is a beacon cycle 700, a contention free area 702, a CSMA area 704, a first beacon 706, a second beacon 708, a third beacon 710, a first timeslot 712, and a second timeslot 714.

The following example demonstrates a server receiving an analog AV signal from, for example, a cable input. The analog AV signal is encoded to an 8 Mbps (mega bit per second) AV stream in the MPEG encoder 408 shown in FIG. 4. The signal switch 410 routes the signal to the PLC I/F 412 and the server sends the AV stream to a client. Prior to transmission, the server asks a master to assign a timeslot. In existing systems, the server 106 obtains a single timeslot that carries an 8 Mbps stream. In accordance with some embodiments, the server obtains two or more timeslots from the master device. The 8 Mbps stream is split into, for example, the first timeslot 712 and the second timeslot 714. In the present example, the first timeslot 712 and the second timeslot 714 each carry a 4 Mbps data stream.

As described, the data stream is split to the first timeslot 712 and the second timeslot 714. In the PLC I/F 412, the data stream is stored in the memory 620 and is divided into two parts. The first part of the data is loaded and sent in the first timeslot 712 and the second part of the data is loaded and sent in the second timeslot 714. The first timeslot 712 and the second timeslot 714 do not have to be consecutive, but can be anywhere within the contention-free area 702.

In operation, the client 108 receives the data stream in both the first timeslot 712 and the second timeslot 714 and merges the data stream in order to reconstruct the original 8 Mbps stream. In the PLC I/F 502, the data stream from each timeslot is stored in the memory 620 and then concatenated. The re-constructed data stream is sent to the de-multiplexer 504 and decoded.

Figure 8:
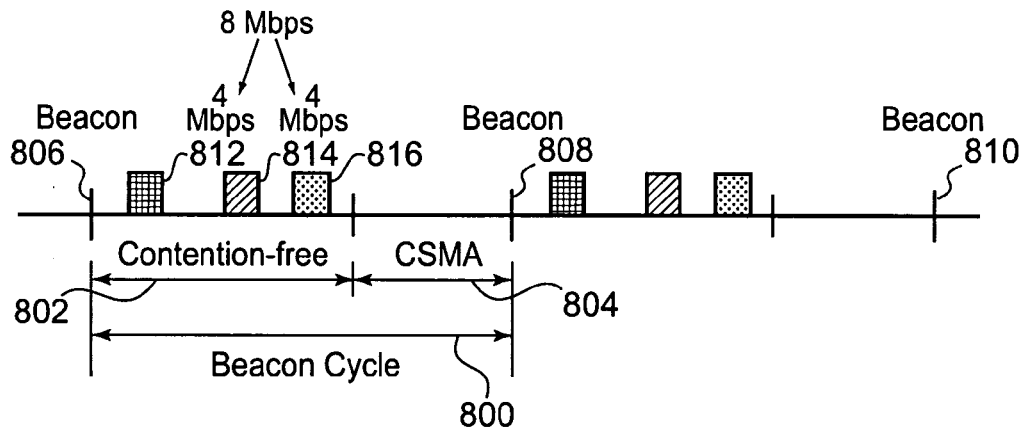
FIG. 8 is a timing diagram illustrating timeslot allocation in accordance with one embodiment.
Figure 9:
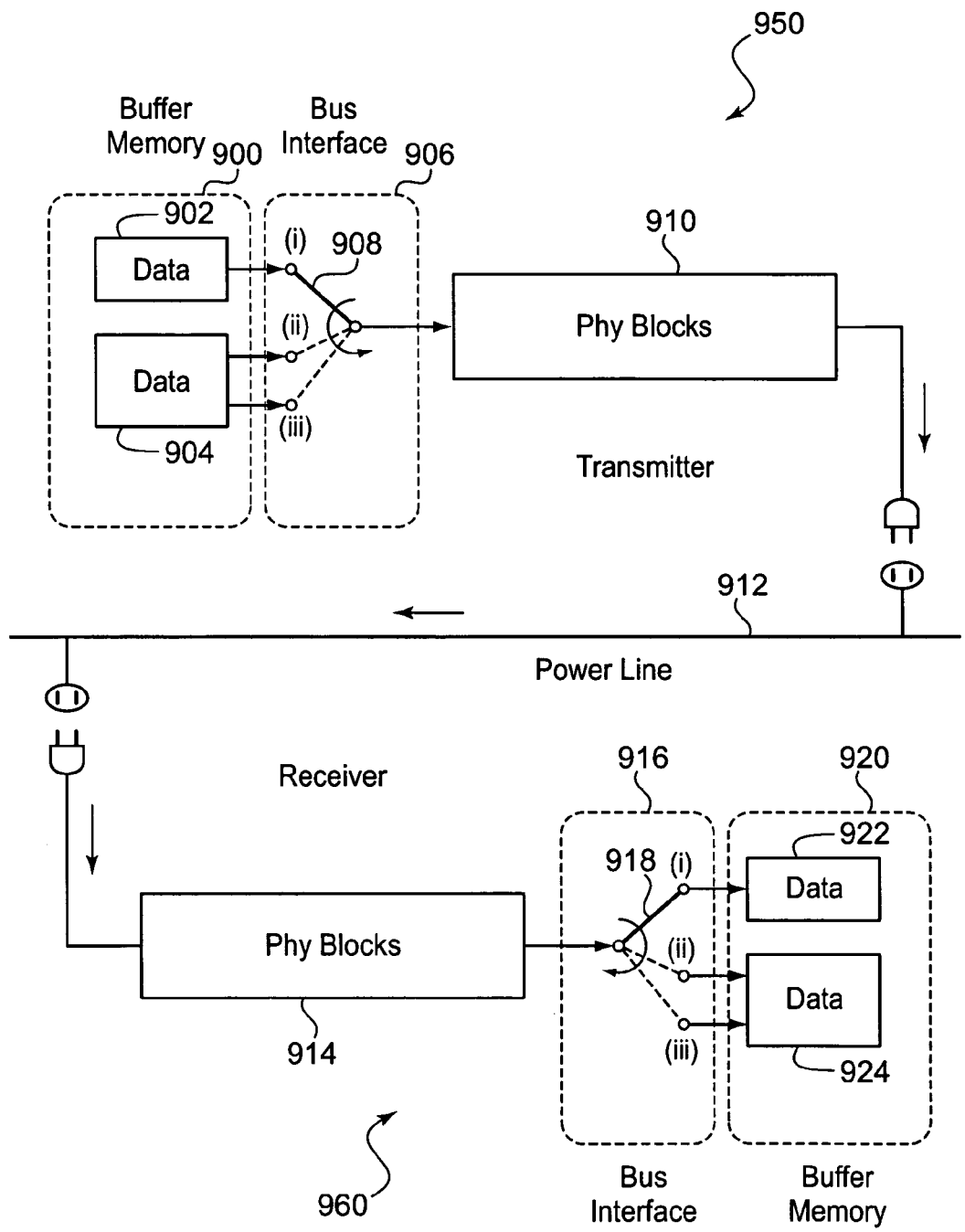
FIG. 9 is a diagram illustrating a receiver and a transmitter in accordance with one embodiment.

FIGS. 8 and 9 illustrate how a transmitter (e.g., the server 106) splits a data steam into multiple the timeslots and how the receiver (e.g., the client 108) reconstructs the original data.

Referring to FIG. 8, a timing diagram is shown illustrating timeslot allocation in accordance with one embodiment. Shown is a beacon cycle 800, a contention free area 802, a CSMA area 804, a first beacon 806, a second beacon 808, a third beacon 810, a first timeslot 812, a second timeslot 814 and a third timeslot 816.

In the example shown, two data streams are sent from the transmitter to one or more receivers. A first data stream having, for example, a 4 Mbps bandwidth, uses the first timeslot 812. A second data stream which has, for example, 8 Mbps bandwidth, uses the second timeslot 814 and the third timeslot 816. The second timeslot 814 is used to send 4 Mbps of the second data stream and the third timeslot 816 is also used to send 4 Mbps of the data stream. In this manner, the second data stream is split between the first timeslot 814 and the second timeslot 816.

Referring next to FIG. 9, a diagram is shown illustrating a receiver and a transmitter in accordance with one embodiment. The bus interface is for example the bus interface 614 shown in FIG. 6. Shown is a transmitter 950, a receiver 960, a transmitter memory 900, a first data block 902, a second data block 904, a transmitter bus interface 906, a transmitter switch 908, a transmitter physical layer 910, a powerline network 912, a receiver-physical layer 914, a receiver bus interface 916, a receiver switch 918, a receiver memory 920, a third data block 922 and a fourth data block 924.

In operation, the first data block 902 in the transmitter memory 900 stores data that will be sent from the transmitter 950 to the receiver 960 utilizing the first timeslot 812 (shown in FIG. 8). The first timeslot 812 is utilized in each beacon cycle and corresponds to a first data stream. The second data block 904 stores data that will be sent from the transmitter 950 to the receiver 960 utilizing the second timeslot 814 and the third timeslot 816 (shown in FIG. 8). The second timeslot 814 and the third timeslot 816 are utilized in each beacon cycle and correspond to a second data stream. The transmitter switch 908 selects data from either the first data block 902 or the second data block 904 to send to the transmitter physical layer 910. The transmitter physical layer 910 is, for example, the analog front-end (AFE) circuit 602, the FEC encoder 622, the interleaver 624, the serial to parallel (S-P) converter 626, the modulator 628 and the Inverse Fast Fourier Transform (IFFT) circuit 630 shown in FIG. 6.

During the first timeslot 812, the transmitter switch 908 is connected to (i), which corresponds to the first data block 902. During the second timeslot 814, the transmitter switch 908 is connected to (ii) and during the third timeslot 816 the transmitter switch 908 is connected to (iii) both of which correspond to the second data block 904. The transmitter switch 908 rotates from (i) to (iii) and is synchronized to the beacon cycle 800. Note that in one embodiment the bus interface has no mechanical switch. FIG. 9, however, illustrates how the bus interface selects the data in the transmitter memory 900.

At the receiver 960, the data sent during the first timeslot 812 is received over the powerline network 912. The data is processed by the receiver physical layer 914. The receiver physical layer is, for example, the analog front-end (AFE) circuit 602, the Fast Fourier Transform (FFT) circuit 604, the demodulator 606, the parallel to serial (P-S) converter 608, the de-interleaver 610, and the forward error correction (FEC) decoder 612 shown in FIG. 6. The output from the receiver physical layer 914 is stored in the third memory block 922 in the receiver memory 920. The receiver bus interface 916 controls the receiver switch 918 such that when receiving the first timeslot 812, the data is stored in the third memory block 922.

The data sent during the second timeslot 814 and the third timeslot 816 is merged and stored in the fourth memory block 924 of the receiver memory 920. A controller (e.g., controller 530) controls the receiver switch 918 so that data is loaded from a single timeslot or from more than one timeslot. The timeslots can be changed on the fly as the switch change is much faster than the beacon cycle. Additionally, the second timeslot 814 and the third timeslot 816 do not have to be consecutive simply because they will be merged into a single data stream. For example, a timeslot for a third data stream may exist between the second timeslot 814 and the third timeslot 816. In this case, the receiver switch 918 is positioned to read the data into the fourth memory block 924, then read data for the third data stream and subsequently read the data into the fourth memory block 924 again.

Figure 10:
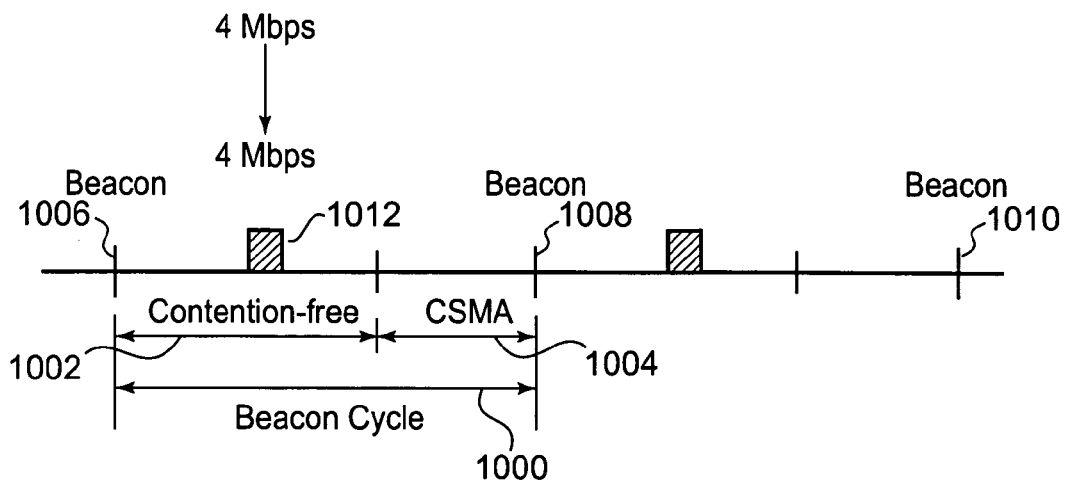
FIG. 10 is a timing diagram illustrating timeslot allocation in accordance with one embodiment.

Referring to FIG. 10 a timing diagram is shown illustrating timeslot allocation in accordance with one embodiment. Shown is a beacon cycle 1000, a contention free area 1002, a CSMA area 1004, a first beacon 1006, a second beacon 1008, a third beacon 1010, and a first timeslot 1012.

Referring back to FIG. 7, assume that a first data stream (8 Mbps steam) is being transmitted and utilizing two 4 Mbps timeslots. Now, assume that network traffic increases and bandwidth for the first data stream must be reduced. FIG. 10 shows the first data stream reduced to a 4 Mbps stream in order to free up bandwidth on the network.

In operation, the master 104 (shown in FIG. 1) sends a bandwidth reduction request to the server 106 in accordance with an exemplary embodiment. In response to the request, the controller 428 reduces the encoding rate of the MPEG encoder 408 from 8 Mbps to 4 Mbps. Following, the PLC interface 412 receives the first data stream as a 4 Mbps stream instead of an 8 Mbps stream and loads data from the first data stream into the first timeslot 1012 only (as compared to the first timeslot 712 and the second timeslot 714 shown in FIG. 7). The client 108 receives the data stream in the first timeslot 1012 and decodes the 4 Mbps stream. The change in the encoding rate is performed on the fly, thereby avoiding decoding intermittence or packet errors. The decoded video quality will become slightly worse due to the rate reduction. However, the reduction in video quality should not be noticeable to the viewer in many embodiments. Additionally, the second timeslot 714 is released and the master 104 is able to use the second timeslot 714 for transfer of a different data stream.

When network traffic on the network gets less busy again (i.e., is reduced), the master 104 assigns a 4 Mbps timeslot back to the server 106. The new timeslot does not have to be the second timeslot 714 that was previously given up by the server 106, but can be any available timeslot. Once the additional timeslot is assigned, the controller 428 commands the encoder 408 to increase the encoding rate from 4 Mbps to the original rate of 8 Mbps. In the PLC interface 412, the data stored in the buffer memory 620 is divided again into two parts and loaded to into two timeslots. The client 108 receives the two timeslots and re-constructs the original 8 Mbps stream as before. The video will be recovered to the original quality. As above, the process of increasing the number of timeslots used for transmission of a data stream is performed on the fly without a break in the display of the video.

In some embodiments, when plenty of network bandwidth is available, the master 104 can give the server 106 more timeslots than required for the transmission of a data stream. In one example, the server is assigned four 4-Mbps slots corresponding to 16 Mbps of bandwidth that can be used for an 8 Mbps stream. In this example, a more robust modulation will be applied for the OFDM sub-carriers. For example, if the original modulation is QPSK (Quadrature Phase Shift Keying), the modulation can be switched to BPSK (Binary Phase Shift Keying). QPSK represents 2 bits of data per symbol. BPSK represents 1 bit of data per symbol. Therefore, twice the number of the timeslots is required for a BPSK modulation scheme. Each of the sub-carriers may use a half density modulation. Alternatively, only some of the sub-carriers with high-density modulation may use robust modulation. For example, 64-QAM is changed to 16-QAM and QPSK remains the same.

As a variation, instead of using a more robust modulation, a more robust error correction code may be used. Moreover, the server may send the same data twice using the twice bandwidth which can prevent packet from being dropped. In the preferred embodiments, all the procedures will be performed on the fly, with no streaming interruption.

Once network traffic increases, the master 104 requests the server 106 to release one or more timeslots. The master 104 changes modulation schemes and releases the additional timeslot(s). If the master 104 requires more slots, the server 106 can reduce encoding rate and release more slot(s) as described above. In this manner if enough bandwidth is available more robust and stable streaming will be performed.

The master devices equally divide the total available bandwidth of the powerline network. For example, as shown in FIG. 1, the first maser 104 and the second master 112 can exist on the same powerline network. In one embodiment, an allotment for each master is a half of the total powerline network bandwidth. That is, each master on the powerline network obtains an equal share of the total bandwidth. In accordance with some embodiments, a master assigns timeslots to each transmission based on the following rules:

1. If there are enough available timeslots, a master may use more timeslots than the allotment for that master.
2. When a master cannot obtain enough timeslots for a new transmission, the total required bandwidth (the bandwidth already used by the master plus the bandwidth for the new transmission) is checked. If the total bandwidth is more than the allotment, the master sends a bandwidth reduction request to each local device (in the same logical network). There is no affect to the other master on the powerline network.
3. When the totally required bandwidth is equal to or less than the allotment, the master globally sends a bandwidth reduction request to the other master(s). The master will reuse timeslot(s) released from the other master(s).
4. When the master receives a bandwidth reduction request from another master and it is using more bandwidth than the allotment, the master locally sends a bandwidth reduction request to each local device.
5. When network traffic decreases and one or more new timeslots becomes available, the master will assign them for rate-reduced transmissions first and then for robust transmissions.

Figure 11:
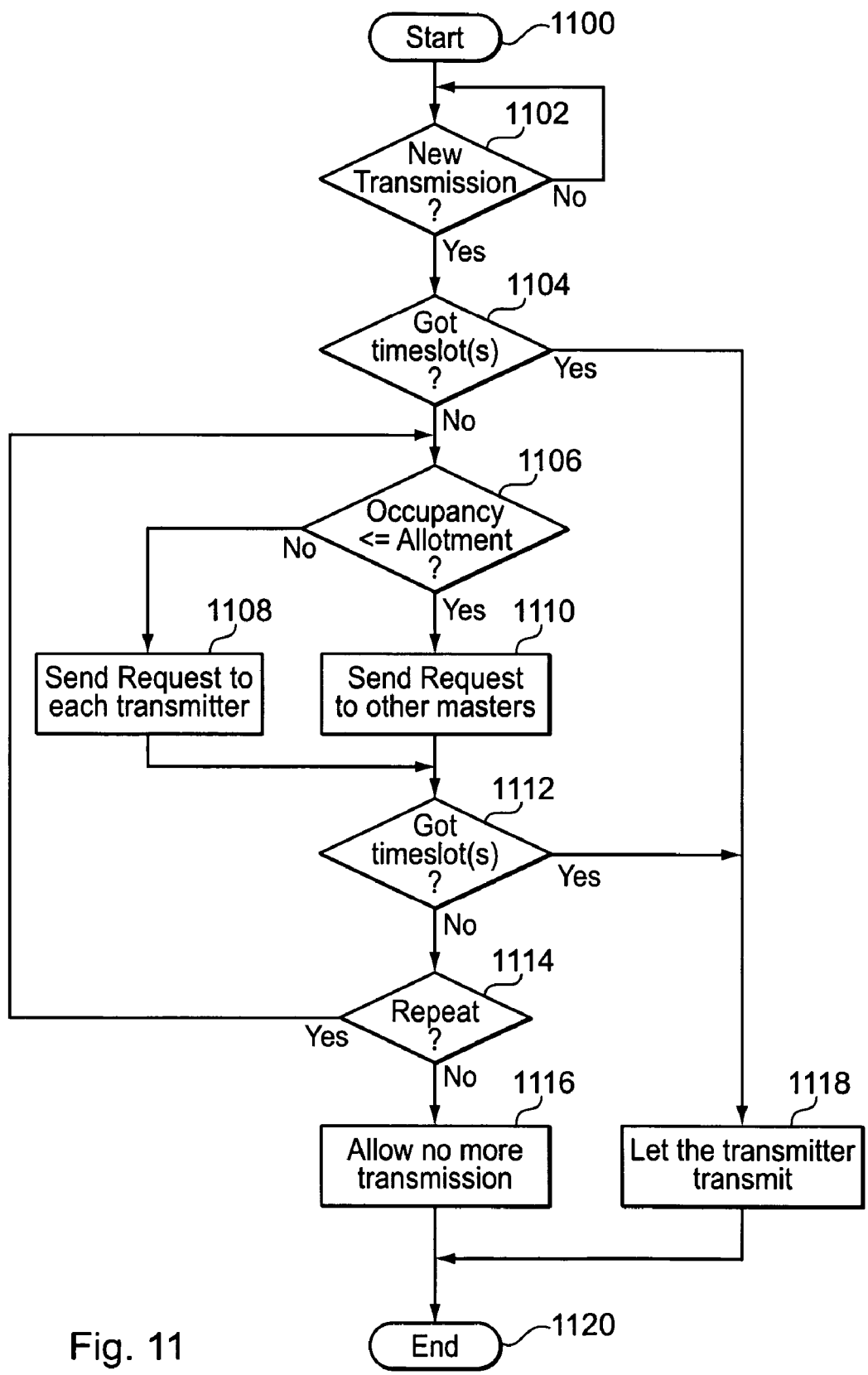
FIG. 11 is a flow diagram illustrating an algorithm for bandwidth assignment performed by a master device on the powerline network in accordance with one embodiment.

FIGS. 11 through 16 illustrate exemplary algorithms for bandwidth control for master devices and transmitting devices on the powerline network. Referring to FIG. 11, a flow diagram illustrates an algorithm for bandwidth assignment performed by a master device on the powerline network. The process starts with step 1100. At branch 1102, the master device waits until a new transmission request (also referred to herein as a bandwidth request) arrives from a transmitter. If a new transmission request is received by the master device, the master device determines in step 1104 whether the master device has sufficient unutilized bandwidth (e.g., timeslots) available to allocate to the transmitter that sent the new transmission request. In some embodiments, for example, the master device may allocate bandwidth to transmitters on a first-come-first-serve basis. In alternative embodiments, the master device may allocate bandwidth to transmitters based upon a priority of the transmission. If the master device had sufficient unutilized bandwidth available to make a bandwidth allocation to the transmitter, the master device proceeds to step 1118 and sends a bandwidth assignment (e.g., a timeslot assignment) to the transmitter. The process then terminates in step 1120.

However, if the master device does not have sufficient unutilized bandwidth available to allocate to the transmitter in step 1104, the process proceeds to step 1106. In step 1106, the total bandwidth that the master device has currently assigned to transmitters is compared to an allotment of bandwidth assigned to the master device. The total bandwidth is the sum of the bandwidth that the master device has currently assigned to transmitters and the bandwidth that the master device will assign for the new transmission. If the total bandwidth currently allocated to transmitters on the master device's local network exceeds the allotment of total network bandwidth assigned to the master device, then the master device will proceed to step 1108 in attempts to reduce bandwidth utilization within the master device's local network. In step 1108, the master device sends a bandwidth reduction request to each transmitter on the master device's local network in an attempt to recover at least a portion of the bandwidth allocated to the transmitters by the master device. Each transmitter performs the algorithm shown in FIG. 14 when it receives the bandwidth reduction request from the master device.

Alternatively, in step 1106, if the total bandwidth currently allocated to transmitters on the master device's local network is less than or equal to the allotment of total network bandwidth assigned to the master device, the process proceeds to step 1110. In step 1110, the master device sends a bandwidth request to other master devices on the powerline network in an attempt to obtain bandwidth from the other bandwidth devices. This step recovers bandwidth for the master device, where, for example, there are one or more other master devices on a powerline network and one or more of the other master devices on the network has allocated bandwidth to transmitters on its local network in excess of the bandwidth allocation for the other master devices. Therefore, the master device may recover at least a portion of the bandwidth that has been over-allocated to the other master devices on the powerline network in order for the master device to be able to allocate bandwidth to the transmitter that sent the new transmission request to the master device in step 1102. Master devices on the powerline network will perform the algorithm illustrated in FIG. 13 after receiving a bandwidth reduction request in order to determine whether or not the master devices have allocated bandwidth to the transmitters on their local networks in excess of the bandwidth allocations of the individual master devices.

In step 1112, the master device determines whether any timeslots were released by at least one transmitter on the master device's local network or by at least one transmitter on the local network of at least one other master device, if the master device sent a bandwidth reduction request to the other devices. If the master device received at least the requested number of timeslots for the new transmission, then the master device proceeds to step 1118 and sends a bandwidth assignment request assigning the timeslots to the transmitter so the transmitter can begin transmitting the new transmission. The process then terminates at step 1120.

However, if in step 1112, the master device did not recover sufficient additional timeslots to allow the new transmission, the master device proceeds to step 1114. In step 1114, the master device determines whether it should send a repeated request bandwidth reduction request by comparing the number of requests sent to a threshold value. If the number of requests is less than the threshold value, then the master device will return to step 1106 in the process and begin a subsequent attempt to recover enough bandwidth for the new transmission. Increasing the threshold value increases the number of attempts that the master device will make before proceeding to step 1116 and abandoning the attempt to assign bandwidth for a new transmission. In step 1116, the master device instructs the transmitter that the transmitter cannot begin the new transmission due to insufficient unutilized bandwidth. The process then terminates in step 1120.

Figure 12:
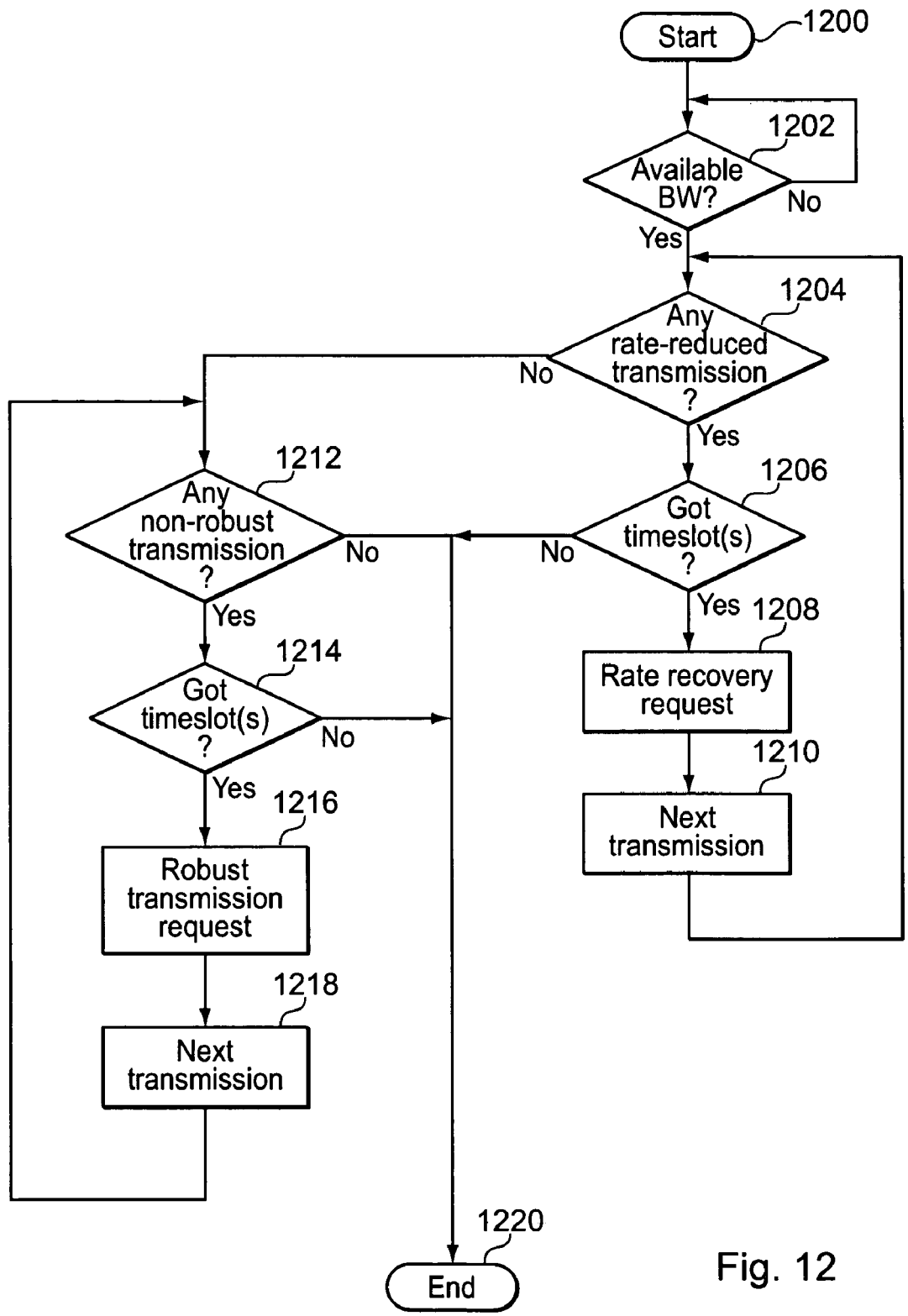
FIG. 12 is a flow diagram illustrating an algorithm for bandwidth recovery and for robust transmission performed by master devices on the powerline network in accordance with one embodiment.

Referring to FIG. 12, a flow diagram illustrates an algorithm for bandwidth recovery and for robust transmission performed by master devices on the powerline network. The process starts at step 1200. At step 1202, the master device monitors bandwidth utilization on the powerline network. When bandwidth becomes available on the powerline network, in step 1204 the master device will attempt to assign timeslots from the available bandwidth. At step 1204, the master device determines whether any transmitters on the master device's local network have reduced-rate transmissions. The master device keeps track of each of the transmissions for each of the transmitters on the master device's local network. The master device will allocate available bandwidth to reduced-rate transmissions in order to allow the transmitter to transmit the data stream at the data stream's original rate before the data stream's rate was reduced.

If, in step 1204, at least one of the transmitters on the master device's local network has a reduced-rate transmission, then the master device proceeds to step 1206. At step 1206, the master device determines whether it has sufficient bandwidth to allocate a timeslot to the reduced-rate transmission. If the master device does not have sufficient timeslots available to allocate to the reduced-rate transmission, the master device proceeds to step 1220 and the process terminates. However, if the master device has sufficient timeslots to allocate to a transmitter with a reduced-rate transmission, the master device will proceed to step 1208. In step 1208, the master device sends a rate adjustment command to a transmitter on the master device's local network with a reduced-rate transmission. The transmitter executes the algorithm illustrated in FIG. 15 starting with step 1500. The master device then proceeds to step 1210, where the master device checks for additional transmissions by transmitters on the master device's local network before returning to step 1204, where the master once again checks for any transmitters on the local network that have reduced-rate transmissions.

If in step 1204, none of the transmitters on the master device's local network have reduced-rate transmissions, then the master device proceeds to step 1212. In step 1212, the master device determines whether at least one transmitter on the master device's local network has a non-robust transmission. If no transmitters on the master device's local network have a non-robust transmission, then the master device proceeds to step 1220 and the process will terminate. However, if at least one transmitter on the master devices local network has at least one non-robust transmission (e.g., the transmitter is utilizing a less robust modulation scheme), then the master device proceeds to step 1214. At step 1214, the master device determines whether the master device has sufficient available timeslots to allocate to a non-robust transmission from the available bandwidth. If the master device does not have sufficient available bandwidth to allocate the timeslots, then the master device proceeds to step 1220 and the process terminates. If the master device does, however, have sufficient available bandwidth in order to allocate timeslots to the transmitter with the non-robust transmission, the master device proceeds to step 1216. At step 1216, the master device sends a robust transmission request to a transmitter device with a non-robust transmission. The transmitter then executes the process illustrated in FIG. 16, beginning with step 1600. The master device then proceeds to step 1218, where the master device checks for additional transmissions by transmitters on the master device's local network before returning to step 1212, where the master once again checks for any transmitters on the local network that have non-robust transmissions.

Figure 13:
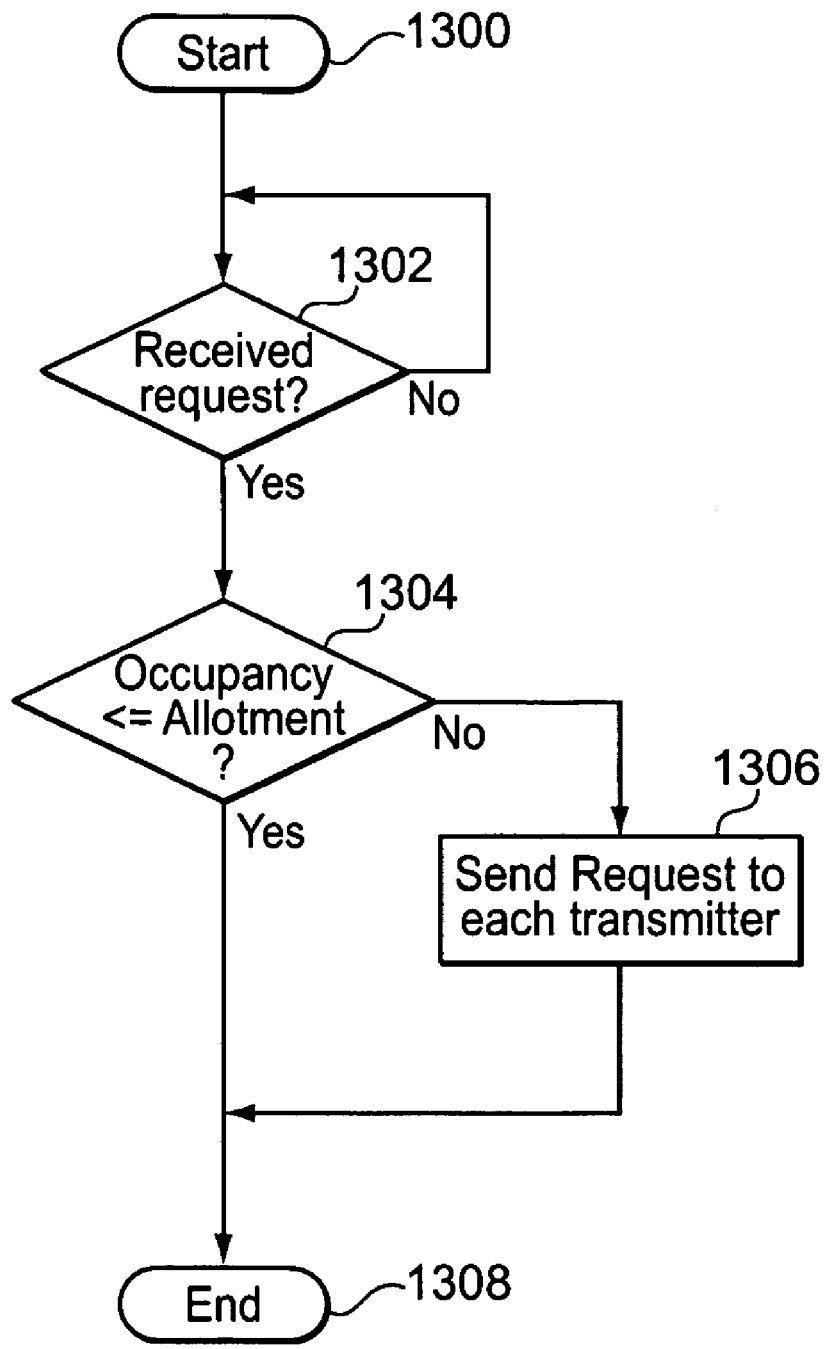
FIG. 13 is a flow diagram illustrating an algorithm executed by each master device when the master device receives a bandwidth reduction request from another master device on the local network in accordance with one embodiment.

Referring to FIG. 13, a flow diagram illustrates an algorithm executed by each master device when the master device receives a bandwidth reduction request from another master device on the local network. The master device sends a bandwidth reduction request in step 1110 of FIG. 11 in order to obtain timeslots from neighboring networks. When a master device receives a bandwidth reduction request from a neighboring master device, the master device begins at step 1300 of the illustrated process. At step 1302, if no bandwidth reduction request is received, the master device waits. However, if a bandwidth reduction request is received, the master device proceeds to step 1304. In step 1304, the master device determines whether the total bandwidth that the master device has currently assigned to transmitters on the master device's local network is compared to an allotment of bandwidth assigned to the master device. If the total bandwidth currently allocated to transmitters on the master device's local network does not exceed the allotment of bandwidth to the master device, the process ends at step 1308. However, if the total bandwidth currently allocated to transmitters on the master device's local network exceeds the allotment of bandwidth to the master device, then the master device proceeds to step 1306 in attempts to reduce bandwidth utilization within the master device's local network. In step 1306, the master device sends a bandwidth reduction request to each transmitter on the master device's local network. Upon receipt of the bandwidth reduction request, each transmitter on the master device's local network performs the algorithm in FIG. 14. The process ends at step 1308.

Figure 14:
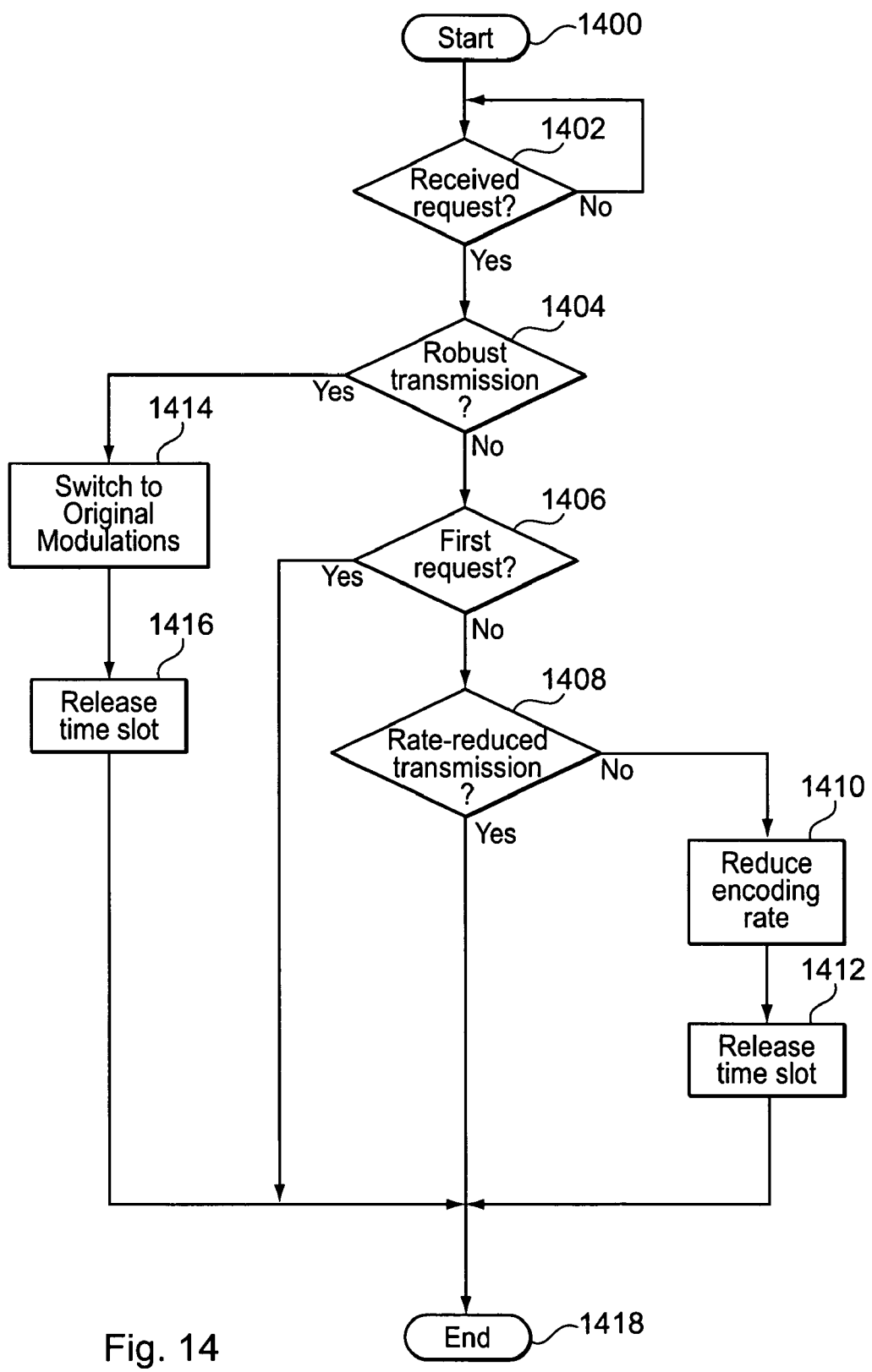
FIG. 14 is a flow diagram illustrating an algorithm executed by each transmitter when the transmitter receives a bandwidth reduction request from a master device on the local network in accordance with one embodiment.

Referring to FIG. 14, a flow diagram illustrates an algorithm executed by each transmitter when the transmitter receives a bandwidth reduction request from a master device on the local network. The master device sends the bandwidth reduction request in step 1108 of FIG. 11 or in step 1306 of FIG. 13.

A transmitter may transmit more than one data stream simultaneously. When the transmitter receives a bandwidth reduction request from the master device, the transmitter will perform the algorithm illustrated in FIG. 14 for each stream that the transmitter is simultaneously transmitting. The process starts with step 1400. At step 1402, the transmitter waits for the bandwidth reduction request to arrive from the master device. If the bandwidth reduction request is received from the master device, the transmitter proceeds to step 1404. In step 1404, the transmitter determines if a data stream is a robust transmission.

A data stream is robust, for example, when the transmitter has been allocated more timeslots than required to transmit the data stream and is thus using a more robust modulation scheme. That is, the transmitter is utilizing a more robust modulation scheme than is required because the transmitter has been allocated additional timeslots. For example, the master device may allocate four 4 Mbps slots to a data stream, where the transmitter only sent a request for 8 Mbps of bandwidth. Therefore, the transmitter will utilize the 8 Mbps of excess bandwidth, for example, when the original modulation for the data stream was to have been Quadrature Phase Shift Keying (QPSK) where 2 bits are transmitted per symbol, the transmitter instead utilizes the more robust Binary Phase Shift Keying (BPSK) where 1 bit is transmitted per symbol. Thus, the data stream would fully utilize the excess timeslots allocated by the master device. In some embodiments, each of the sub-carriers may use a half density modulation. Alternatively, only some of the sub-carriers with high-density modulation may use robust modulation. For example, 64-QAM is changed to 16-QAM and QPSK remains the same. In some alternate embodiments, more robust error correction is utilized instead of a more robust modulation scheme. Moreover, the server may send the same data twice (using the twice bandwidth) in order to prevent packet drop.

If the data stream is a robust transmission, then the transmitter proceeds to step 1414. At step 1414, the transmitter switches the modulation of the data stream to an original, less robust modulation scheme. The transmitter then releases one or more excess timeslots in step 1416 and the process terminates in step 1418.

If the data stream is a not robust transmission, then the transmitter proceeds from step 1404 to step 1406. At step 1406, the transmitter determines if this is the first bandwidth reduction request from the master device. If this is the first bandwidth reduction request received from the master device, then the transmitter will not reduce the bandwidth and the process terminates at 1418. In some embodiments, only a robust transmission will be rate-reduced with the first bandwidth reduction request. However, if this was not the first bandwidth reduction request received from the master device, then the transmitter will proceed to step 1408. In step 1408, the transmitter determines whether the data stream is a reduced-rate transmission. If the data stream is a reduced-rate transmission, the transmitter will not further decrease the bandwidth allocated to the data stream and the process will proceed to terminate at step 1418. If the data stream was not a reduced-rate transmission, the transmitter will proceed to step 1410 where the encoding rate of the data stream is decreased before proceeding to step 1412 where at least one of the timeslots allocated to the data stream is released to the master device. The process then terminates at step 1418.

Figure 15:
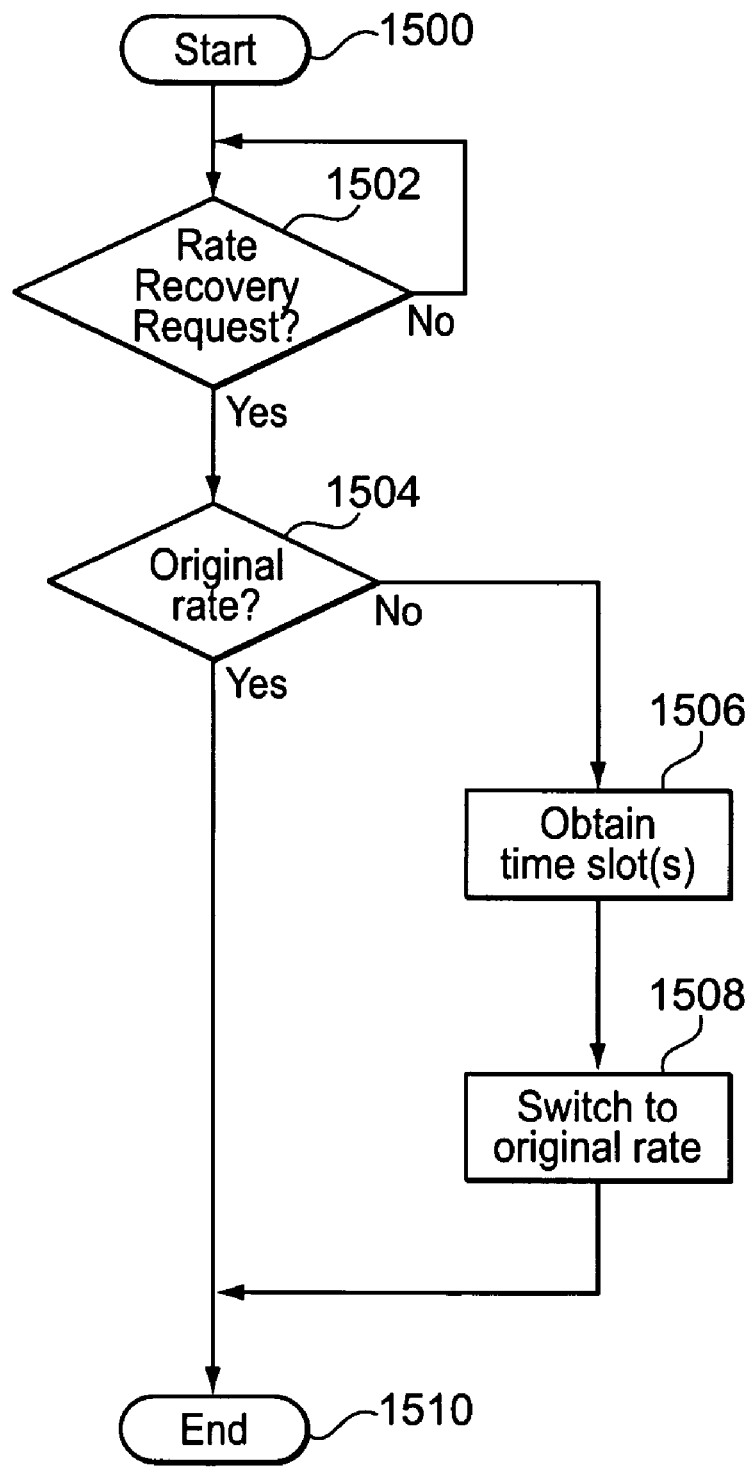
FIG. 15 is a flow diagram illustrating an algorithm followed by transmitters on a powerline network for handling an encoding rate recovery request from a master device on the powerline network in accordance with one embodiment.

Referring to FIG. 15, a flow diagram illustrates an algorithm followed by transmitters on a powerline network for handling an encoding rate recovery request from a master device on the powerline network. The transmitter (e.g., a server) starts at step 1500 and proceeds to step 1502 where the transmitter waits for a rate recovery request from a master device on the powerline network. When the transmitter receives a rate recovery request from a master device on the powerline network, the transmitter proceeds to step 1504. At step 1504, the transmitter determines whether a data stream is being transmitted at an original rate. If the data stream is being transmitted at an original rate, then the transmitter proceeds to step 1510 and the algorithm terminates. However, if the data stream is not being transmitted at an original rate (e.g., at a rate lower than the original rate), then the transmitter proceeds to step 1506 where the transmitter receives at least one additional timeslot. At step 1508, the encoding rate of the data stream is increased to an original rate. The transmitter then proceeds to step 1510 and the algorithm terminates.

Figure 16:
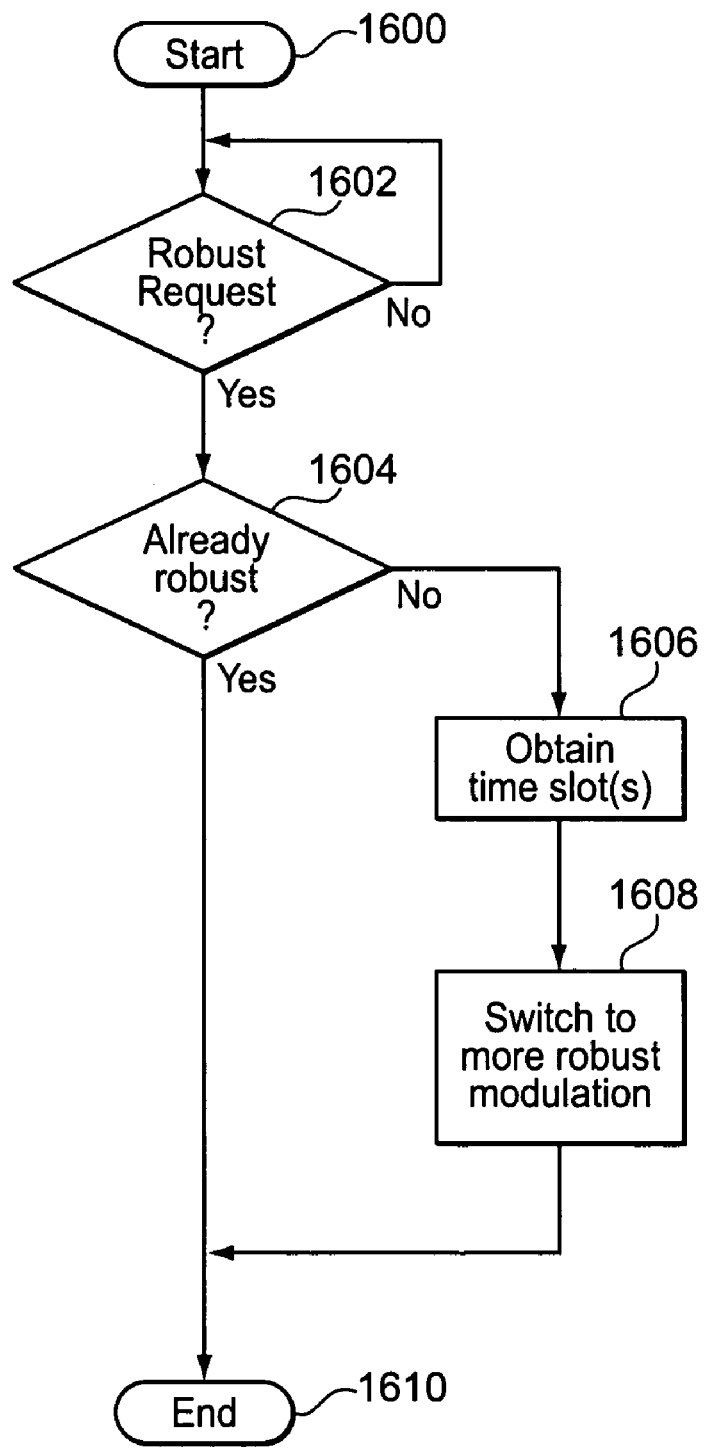
FIG. 16 is a flow diagram illustrating an algorithm followed by transmitters on a powerline network for handling a robust transmission request from a master device on the powerline network in accordance with one embodiment.

Referring to FIG. 16, a flow diagram illustrates an algorithm followed by transmitters on a powerline network for handling a robust transmission request from a master device on the powerline network. The transmitter starts at step 1600 and proceeds to step 1602 where the transmitter waits for a robust transmission request from a master device on the powerline network. When the transmitter receives a rate recovery request from a master device on the powerline network, the transmitter proceeds to step 1604. At step 1604, the transmitter determines whether a data stream is already a robust transmission. If the transmitter is already transmitting the data stream as a robust transmission, then the transmitter proceeds to step 1610 where the algorithm terminates. Otherwise, if the transmitter is not transmitting the data stream as a robust transmission, the transmitter proceeds to step 1606. At step 1606, the transmitter receives at least one additional timeslot. At step 1608, the transmitter switches the modulation of the data stream to a more robust modulation scheme. The transmitter then proceeds to step 1610 and the algorithm terminates.

Figure 17:
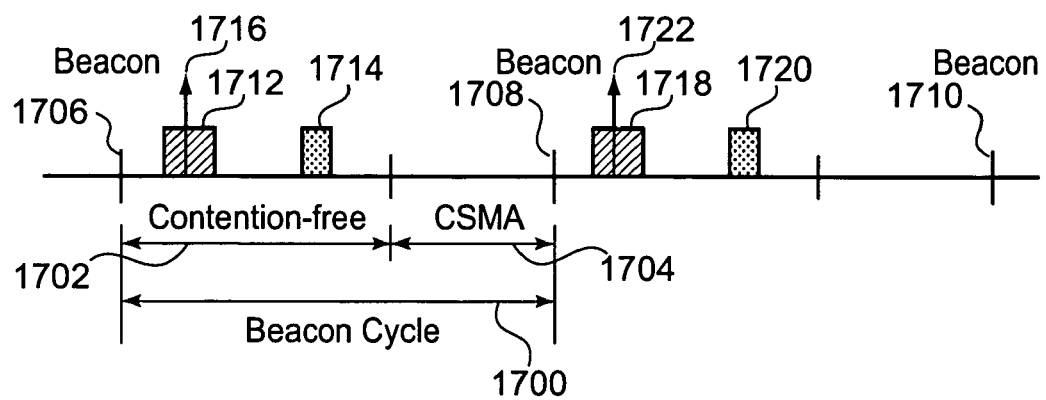
FIG. 17 is a timing diagram illustrating timeslot allocation in a noisy environment in accordance with one embodiment.

Referring to FIG. 17, a timing diagram is shown illustrating timeslot allocation in a noisy environment in accordance with one embodiment. Shown is a beacon cycle 1700, a contention free area 1702, a CSMA area 1704, a first beacon 1706, a second beacon 1708, a third beacon 1710, a first timeslot 1712, a second timeslot 1714, a first noise signal 1716, a third timeslot 1718, a fourth timeslot 1720, and a second noise signal 1722.

The first noise signal 1716 is interfering with the first timeslot. For each beacon cycle the noise signal can continue to interfere with the same timeslot. As shown, the second noise signal 1722 corresponds to the first noise signal 1716 one beacon cycle later in time. Therefore, while the first timeslot 1712 has been allocated for a certain bandwidth (e.g., 8 Mbps) the actual bandwidth may be less (e.g., 4 Mbps) due to the first noise signal 1716.

In operation, network conditions often will vary. For example, even if 5 Mbps bandwidth is reserved for a data stream, actual bandwidth might be less than 5 Mbps due to noise or other reasons. Noise from a lamp dimmer or a hair dryer, for example can be synchronized to an AC line cycle (e.g., 50 or 60 Hz). If a beacon is synchronized to the AC line cycle, noise appears at the same place every beacon cycle (such as is demonstrated by the first noise signal 1716 and the second noise signal 1722) and causes a reduction in the actual bandwidth that is available for the data stream that is being transmitted in the same timeslot (e.g., the first timeslot 1712). The encoder 408 (shown in FIG. 4) always monitors the actual bandwidth available for the transmission. When the bandwidth gets worse due to noise, the encoder dynamically reduces the encoding rate so the data stream will not be corrupted due to the reduced available bandwidth. The reduction in the encoding rate, however, can cause noticeable picture quality degradation. In order to prevent degradation in picture quality, additional bandwidth can be provided for the transmission of the data stream. For example, if a server is transmitting a data stream in the first timeslot 1712 and the noise signal 1716 starts to interfere with the transmission of the data stream, a master device can allocate the second timeslot 1714 to the server in addition to the first timeslot 1712. The data stream data is then split between the first timeslot 1712 and the second timeslot 1714. As an example, if the first timeslot 1712 is an 8 Mbps timeslot and the noise signal reduces the actual bandwidth of the first timeslot to 4 Mbps, the second timeslot 1714 having, for example, a 4 Mbps bandwidth can be allocated to the server. Thus, the server still has a total of 8 Mbps of actual bandwidth available.

Figure 18:
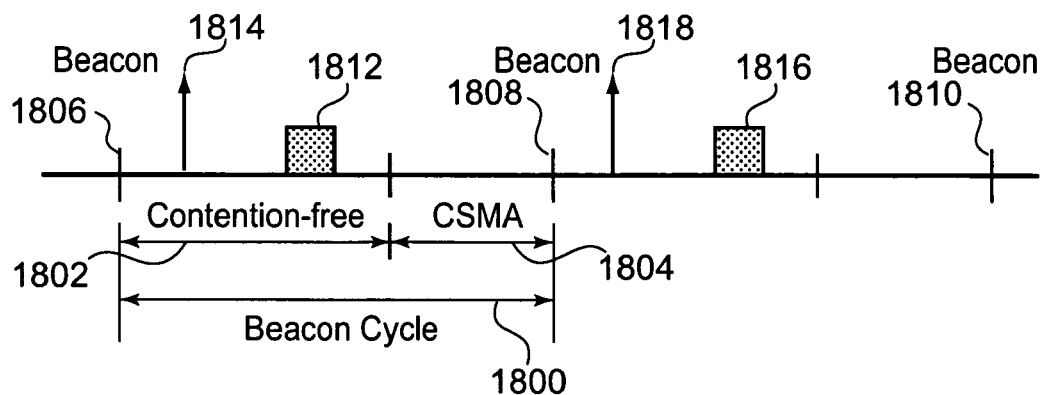
FIG. 18 is a timing diagram illustrating timeslot allocation in a noisy environment in accordance with one embodiment.

Referring to FIG. 18, a timing diagram is shown illustrating timeslot allocation in a noisy environment in accordance with one embodiment. Shown is a beacon cycle 1800, a contention free area 1802, a CSMA area 1804, a first beacon 1806, a second beacon 1808, a third beacon 1810, a first timeslot 1812, a first noise signal 1814, a second timeslot 1816, and a second noise signal 1818.

Alternatively to the example shown in FIG. 17, instead of allocating the second timeslot 1714 to be used for the transmission of the data stream along with the first timeslot 1712, a new timeslot (i.e., the first timeslot 1812) can replace the timeslot 1712 that was interfered with the noise signal 1716. That is, when the first timeslot 1712 of FIG. 17 is interfered with the first noise signal 1716, the server assigns the first timeslot 1812 of FIG. 18 for the transmission of the data stream. In this case, the fist timeslot 1712 is then released and is available to be used for transmission of a different data stream. Having only one timeslot (i.e., the first timeslot 1812) is simpler and preferred as compared to controlling two or more slots (i.e., the first timeslot 1712 and the second timeslot 1714) in accordance with some embodiments.

Figure 19:
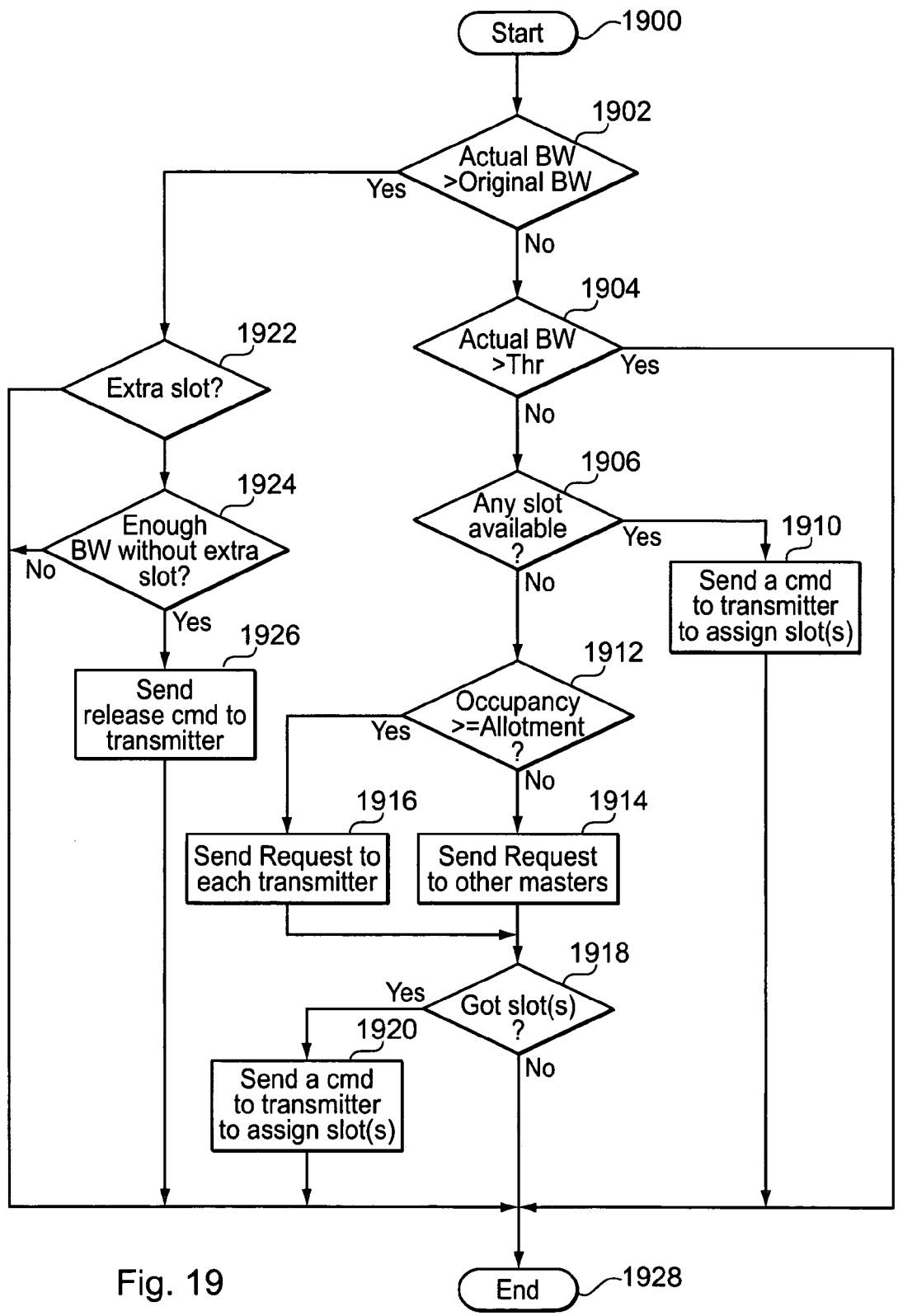
FIG. 19 is a flow diagram illustrating an algorithm for a master device on a powerline network for handling bandwidth reassignment in accordance with one embodiment.

Referring to FIG. 19, a flow diagram illustrates an algorithm executed by a master device on a powerline network for handling bandwidth reassignment. The algorithm starts at step 1900 and continues to step 1902. At step 1902, the master device determines whether the actual bandwidth of a timeslot is less than an original bandwidth for the timeslot. The actual bandwidth of the timeslot can be less than the original bandwidth for the timeslot when, for example, noise is introduced into the network. If the actual bandwidth of the timeslot is not more than the original bandwidth of the timeslot, then the master device proceeds to step 1904. At step 1904, the master device determines whether the actual bandwidth is greater than a threshold value. For example, in some embodiments the threshold value is 80%, and the master device determines whether the actual bandwidth is greater than the 80% of the original bandwidth of a timeslot. If the actual bandwidth is greater than the threshold for a timeslot, then the master device proceeds to step 1928, and the algorithm terminates. However, if the actual bandwidth of a timeslot is less than or equal to the threshold value, in step 1904, then the master device proceeds to step 1906. In step 1906, the master device determines whether at least one available timeslot can be allocated to replace the timeslot having a reduced bandwidth (i.e., an actual bandwidth less than or equal to the threshold value of the original bandwidth). If the master device determines that at least one timeslot is available, the master device proceeds to step 1910 where the master device sends a bandwidth assignment request to the transmitter. The transmitter is assigned a new timeslot having an actual bandwidth greater than or equal to the threshold value of the original bandwidth. The master device then proceeds to step 1928 and the algorithm terminates.

If the master device did not have at least one available timeslot available in step 1906, the master device proceeds to step 1912.

At step 1912, the master device determines whether total bandwidth allocated to transmitters on the master device's local network exceeds a total bandwidth allotment assigned to the master device. In some embodiments, the total bandwidth allotment assigned to the master device may is determined by the number of master devices on the powerline network. For example, if there are three master devices on a powerline network, then each master device is assigned a total bandwidth assignment of thirty-three percent of the total bandwidth of the powerline network. If the total of bandwidth allocated to transmitters on the master device's local network equals or exceeds the total bandwidth allotment assigned to the master device, then the master device proceeds to step 1916.

At step 1916, the master device sends a bandwidth reduction request to each transmitter on the master device's local logical network. Alternatively, if the total bandwidth allocated to transmitters on the master device's local logical network is less than the total bandwidth allotment assigned to the master device, then the master device proceeds to step 1914. At step 1914, the master device sends a bandwidth reduction request to the other master devices on the powerline network in an attempt to get the other master devices to release some bandwidth. At step 1918, the master device determines if either the local devices allocated or other master devices on the network allocated the master device some timeslots. If the master device was not assigned at least one timeslot, then the master device proceeds to step 1928 and the algorithm terminates. Otherwise, the master device proceeds to step 1920, where the master device sends a bandwidth assignment request to transmitter to assign the at least one additional timeslot obtained in step 1918 to the transmitter assigned to the timeslot where the actual bandwidth was less than a threshold value (determined in step 1904). The master then proceeds to step 1928 and the process terminates.

If at step 1902, the master device determines the actual bandwidth of a timeslot is greater than an original bandwidth for the timeslot, then the master device proceeds to step 1922. The actual bandwidth of a timeslot may be greater than an original bandwidth for a timeslot where, for example, an additional timeslot was allocated to a transmitter in order compensate for a loss of bandwidth due to noise in another timeslot assigned to a transmitter. At step 1922, the master device determines whether the timeslot is an extra timeslot that was allocated to a transmitter on the master device's local logical network. If the timeslot is not an extra timeslot, then the master device proceeds to step 1928 and the process terminates. However, if the timeslot is an extra timeslot, then the master device proceeds to step 1924. At step 1924, the master device determines whether the transmitter has enough bandwidth to transmit a data stream without the extra timeslot. If the master device determines that the extra bandwidth is required to transmit the data stream, the master device proceeds to step 1928 and the algorithm terminates. Otherwise, if the master device determines that transmitter has sufficient bandwidth without the extra bandwidth, then the master device sends a reduce bandwidth request to the transmitter in step 1926 in order to get the transmitter to release the extra timeslot. The master device then proceeds to step 1928 and the algorithm terminates.

Figure 20:
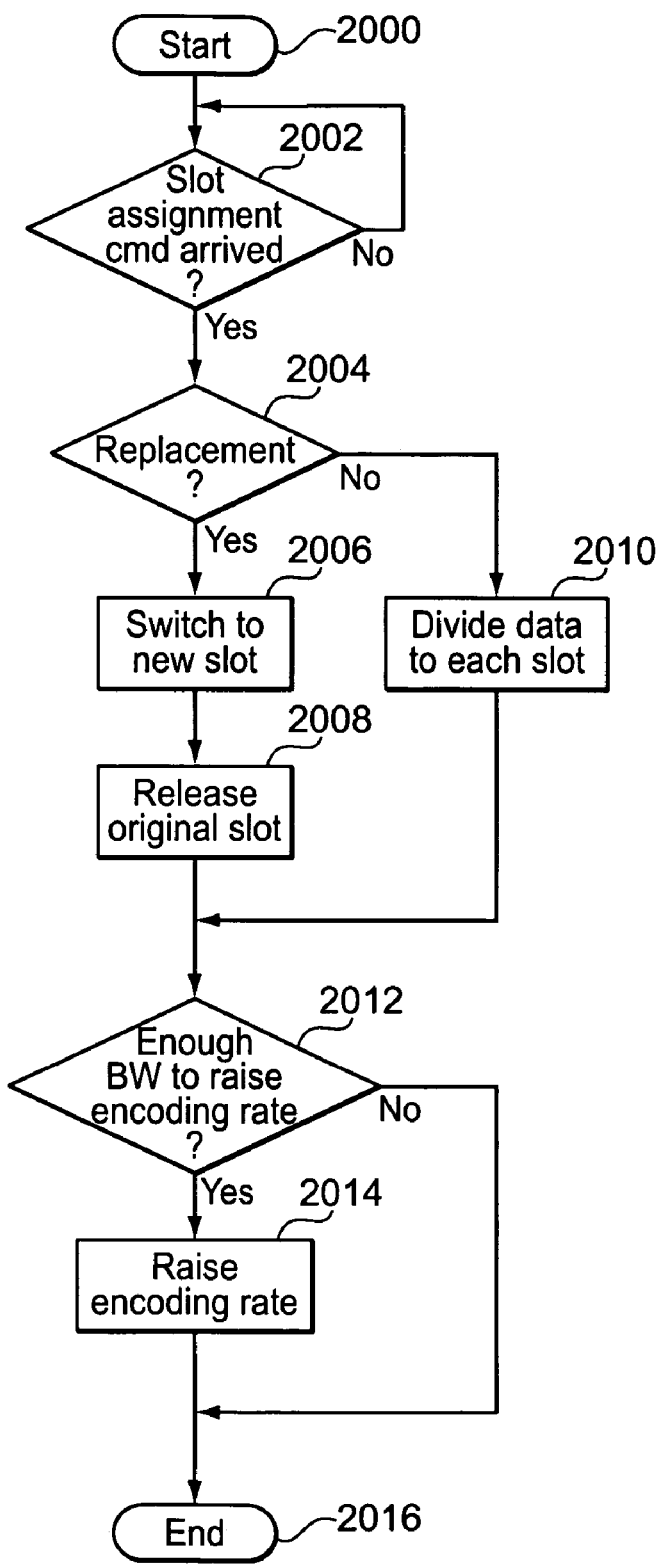
FIG. 20 is a flow diagram illustrating an algorithm for a transmitter for handling a new timeslot assignment in accordance with one embodiment.

Referring to FIG. 20, a flow diagram illustrates an algorithm for a transmitter for handling a new timeslot assignment. The transmitter starts at step 2000 and proceeds to step 2002 where it waits for a slot assignment command from a master device on the powerline network. When the transmitter receives a bandwidth assignment request the transmitter proceeds to step 2004. If the timeslot command indicates that a new timeslot is to replace an original timeslot, then the transmitter proceeds to step 2006. At step 2006, the transmitter assigns a data stream to the new timeslot that is currently assigned to the timeslot to be replaced. At step 2008, the transmitter releases the timeslot to be replaced. Alternatively, if the timeslot command indicates that the new timeslot is not a replacement for an existing timeslot, then the transmitter proceeds to step 2010. At step 2010, the transmitter divides a data stream to be transmitted among a total bandwidth allocated to the transmitter. The total bandwidth allocated to the transmitter includes a new timeslot and an original bandwidth allotment assigned to the transmitter divided into one or more timeslots.

At step 2012, the transmitter determines whether the total bandwidth assigned to the transmitter is sufficient to increase the encoding rate of a data stream. If the total bandwidth assigned to the transmitter is not sufficient to increase the encoding rate of a data stream, then the transmitter proceeds to step 2016 where the algorithm terminates. Otherwise, if the bandwidth assigned to the transmitter is sufficient to increase the encoding rate of a data stream, then the transmitter proceeds to step 2014. At step 2014, the transmitter increases the encoding rate of a data stream. The transmitter then proceeds to step 2016 where the algorithm terminates.

Figure 21:
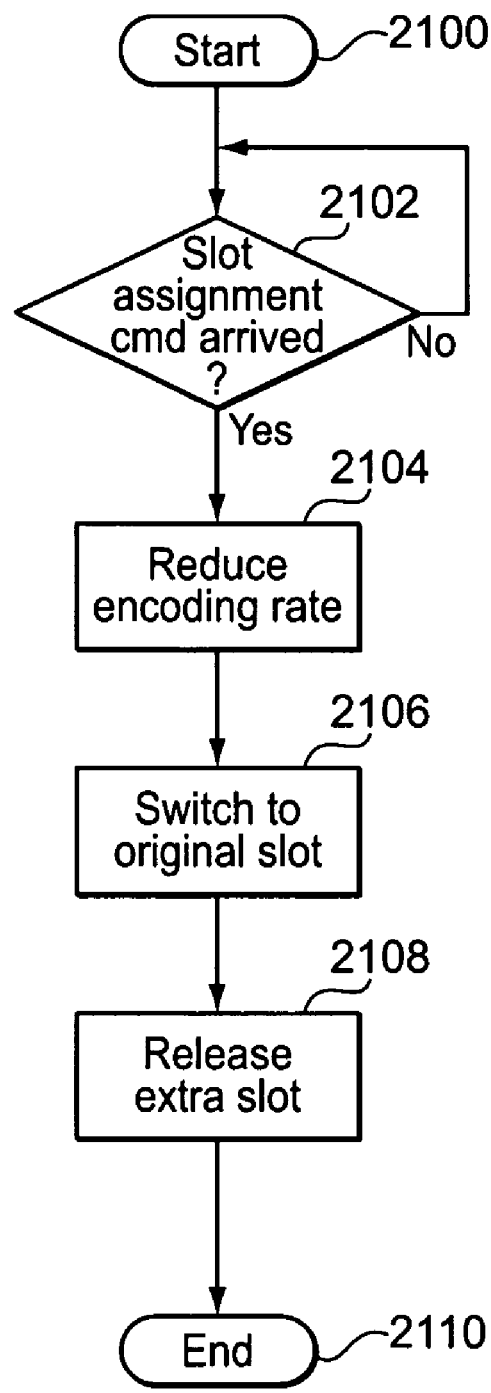
FIG. 21 is a flow diagram illustrating an algorithm for a transmitter for handling a timeslot release request from a master device on a powerline network in accordance with one embodiment.

Referring to FIG. 21, a flow diagram illustrates an algorithm for a transmitter for handling a timeslot release request from a master device on a powerline network. The algorithm is executed by the transmitter when a timeslot release request is sent by a master device in FIG. 19, step 1926. The transmitter starts at step 2100, and proceeds to step 2102 where the transmitter waits for a reduce bandwidth request from a master device on the powerline network. When the transmitter receives the reduce bandwidth request the transmitter proceeds to step 2104. At step 2104, the transmitter reduces the encoding rate of a data stream so that a data stream may be transmitted with only an original timeslot allotment. At step 2106, the transmitter begins transmitting the data stream utilizing only the original timeslot allotment. At step 2108, the transmitter releases any timeslots allocated to the transmitter that are in excess of the original timeslot allotment assigned to the transmitter, and the process terminates at step 2110.

Figure 22:
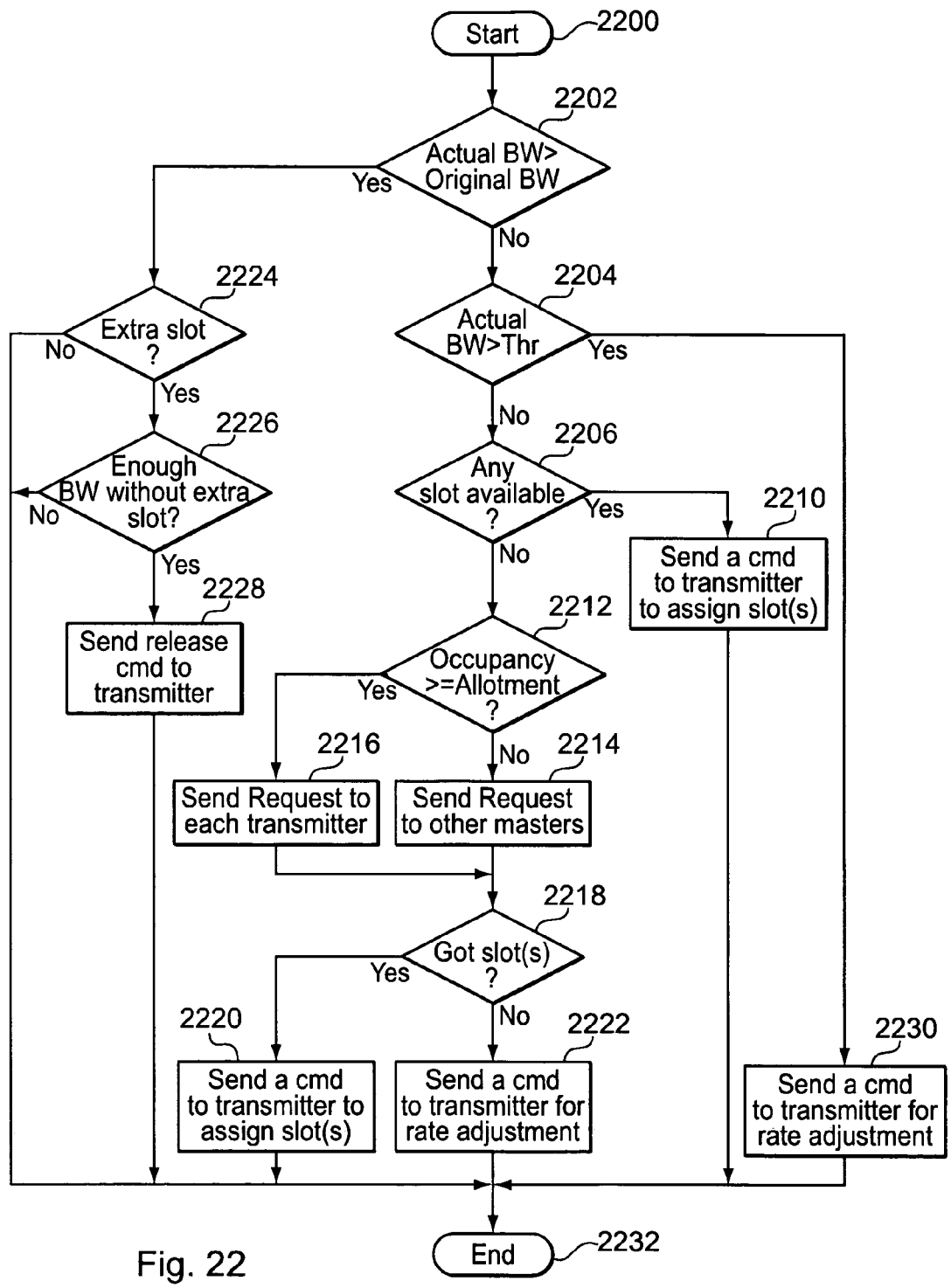
FIG. 22 is a flow diagram illustrating an alternate embodiment of an algorithm for a master device on a powerline network for handling bandwidth reassignment in accordance with one embodiment.

Referring to FIG. 22, a flow diagram illustrates an alternate embodiment of an algorithm for a master device on a powerline network for handling bandwidth reassignment. The algorithm starts at step 2200 and continues to step 2202. At step 2202, the master device determines whether the actual bandwidth of a timeslot is less than an original bandwidth for the timeslot. If the actual bandwidth of the timeslot is not more than the original bandwidth of the timeslot, then the master device proceeds to step 2204. At step 2204, the master device determines whether the actual bandwidth is greater than a threshold value. For example, in some embodiments the threshold value is 80%, and the master device determines whether the actual bandwidth is greater than the 80% of the original bandwidth of a timeslot. If the actual bandwidth is greater than the threshold for a timeslot, then the master device proceeds to step 2230 where the master device sends a rate reduction request to a transmitter before the process terminates at step 2232. However, if the actual bandwidth of a timeslot is less than or equal to the threshold value, in step 2204, then the master device proceeds to step 2206. In step 2206, the master device determines whether the master device has at least one available timeslot that can be allocated to replace the timeslot with an actual bandwidth less than or equal to the threshold value. If the master device has at least one available timeslot, the master device proceeds to step 2210 where the master device sends a bandwidth assignment request to the transmitter which is assigned the timeslot with an actual bandwidth less than or equal to the threshold value. The master device then proceeds to step 2232 and the algorithm terminates.

If the master device did not have at least one available timeslot available in step 2206, the master device proceeds to step 2212.

At step 2212, the master device determines whether total bandwidth allocated to transmitters on the master device's local network exceeds a total bandwidth allotment assigned to the master device. In some embodiments, the total bandwidth allotment assigned to the master device may is determined by the number of master devices on the powerline network. For example, if there are three master devices on a powerline network, then each master device is assigned a total bandwidth assignment of thirty-three percent of the total bandwidth of the powerline network. If the total of bandwidth allocated to transmitters on the master device's local network equals or exceeds the total bandwidth allotment assigned to the master device, then the master device proceeds to step 2216. At step 2216, the master device sends a bandwidth reduction request to each transmitter on the master device's local logical network. Alternatively, if the total bandwidth allocated to transmitters on the master device's local logical network is less than the total bandwidth allotment assigned to the master device, then the master device proceeds to step 2214. At step 2214, the master device sends a bandwidth reduction request to the other master devices on the powerline network in an attempt to get the other master devices to release some bandwidth. At step 2218, the master device determines if either the local devices allocated or other master devices on the network allocated the master device some timeslots. If the master device was not assigned at least one timeslot, the master device sends a rate adjustment command to a the transmitter in step 2222 before the master device proceeds to step 2232 and the algorithm terminates. The master device sends the rate adjustment command to the transmitter to instruct the transmitter to adjust the rate of transmission of a data stream to ensure that the data stream can be transmitted in the timeslots allocated to the transmitter. Noise or other interference on the network may have reduced the bandwidth of the timeslot or timeslots allocated to the transmitter (determined in steps 2202 and 2204). The transmitter is unable to allocate any additional or replacement timeslots to the transmitter, so the master device instructs the transmitter to decrease the transmission rate to compensate for the noise or other interference. Otherwise, the master device proceeds to step 2220, where the master device sends a bandwidth assignment request to transmitter to assign the at least one additional timeslot obtained in step 2218 to the transmitter assigned to the timeslot where the actual bandwidth was less than a threshold value (determined in step 2204). The master then proceeds to step 2232 and the process terminates.

If at step 2202, the master device determines the actual bandwidth of a timeslot is greater than an original bandwidth for the timeslot, then the master device proceeds to step 2224. The actual bandwidth of a timeslot may be greater than an original bandwidth for a timeslot where, for example, an additional timeslot was allocated to a transmitter in order compensate for a loss of bandwidth due to noise in another timeslot assigned to a transmitter. At step 2224, the master device determines whether the timeslot is an extra timeslot that was allocated to a transmitter on the master device's local logical network. If the timeslot is not an extra timeslot, then the master device proceeds to step 2232 and the process terminates. However, if the timeslot is an extra timeslot, then the master device proceeds to step 2226. At step 2226, the master device determines whether the transmitter has enough bandwidth to transmit a data stream without the extra timeslot. If the master device determines that the extra bandwidth is required to transmit the data stream, the master device proceeds to step 2232 and the algorithm terminates. Otherwise, if the master device determines that transmitter has sufficient bandwidth without the extra bandwidth, then the master device sends a reduce bandwidth request to the transmitter in step 2228 in order to get the transmitter to release the extra timeslot. The master device then proceeds to step 2232 and the algorithm terminates.

Figure 23:
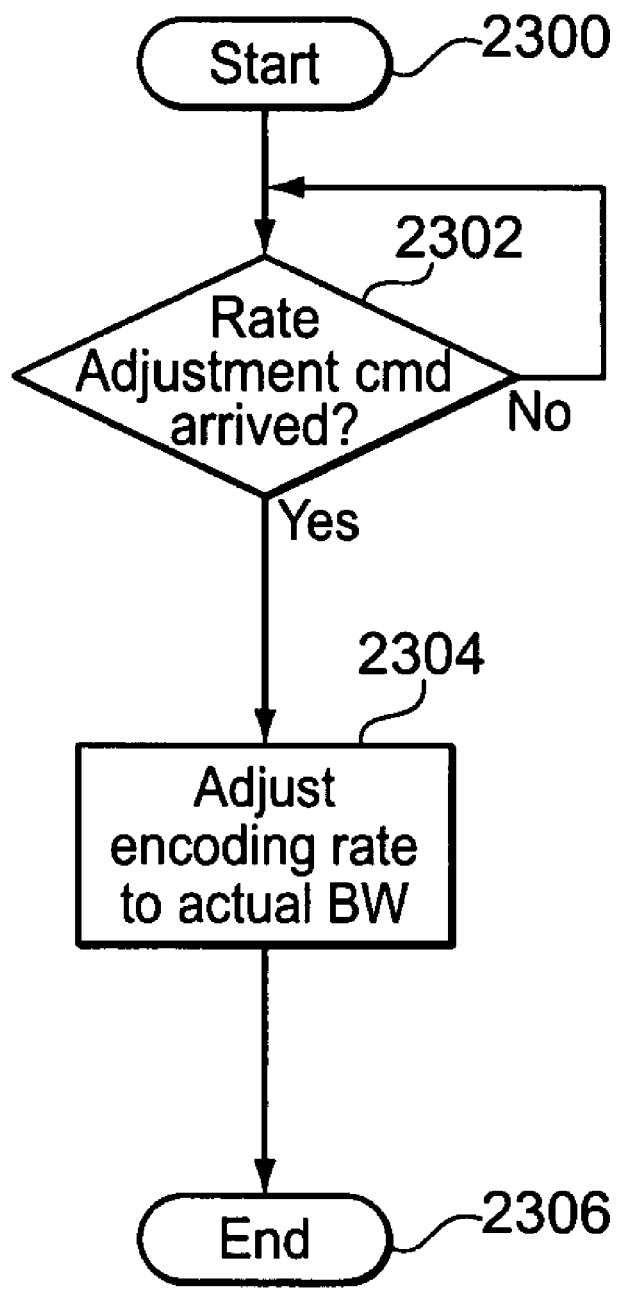
FIG. 23 is a flow diagram illustrating an embodiment of an algorithm for a transmitter on a powerline network for handling a rate adjustment request from a master device in accordance with one embodiment.

Referring to FIG. 23, a flow diagram illustrates an embodiment of an algorithm for a transmitter on a powerline network for handling a rate adjustment request from a master device. The transmitter starts at step 2300 and proceeds to step 2302 where the transmitter waits for a rate adjustment command to arrive from a master device on the powerline network. When the transmitter receives a rate adjustment command from a master device on the powerline network, the transmitter proceeds to step 2304 where the transmitter adjusts the encoding rate of a transmission to match the actual bandwidth of a bandwidth allocation due to noise or other interference on the powerline network. The transmitter then proceeds to step 2306 where the algorithm terminates.

Variations to some of the embodiments described herein can also be made. For example, a data stream described herein was split into two timeslots. However, the data stream may be split to two or more timeslots. Furthermore, the data size of each timeslot does not have to be equal. For example, an 8 Mbps stream may be split to a 6 Mbps timeslot and 2 Mbps timeslot. Additionally, rate reduction may be applied only to some high bit rate transmissions, for example, MPEG-HD streams and not applied to other transmissions.

In another variation, priority of each transmission may be considered for bandwidth assignment. For example, the highest prioritized transmission will be rate-reduced last and rate-recovered first. Alternatively, the highest prioritized transmission can always be at the original rate without having the rate reduced. Additionally, the embodiments described herein can be applied to frequency access slots in a FDMA (Frequency Division Multiple Access) system or a TDMA-FDMA hybrid system. Some embodiments can be applied to any other wired or wireless networks.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

I claim:

1. A method for adjusting a transmission rate of a transmission for a network device on a network comprising:
   receiving at the network device an allocation of additional bandwidth from a master device on the network; and
   assigning data from a transmission to be transmitted in a total bandwidth allocation to the network device including the additional bandwidth allocation and a first bandwidth allocation;
   determining whether the total bandwidth allocation to the network device is sufficient to allow the network device to utilize a more robust transmission scheme for the transmission; and
   adjusting the transmission scheme of the transmission to a more robust transmission scheme when the total bandwidth allocation to the network device is sufficient to allow the network device to utilize a more robust transmission scheme for the transmission.

2. A method for adjusting a transmission rate of a transmission for a network device on a network comprising:
   receiving at the network device an allocation of additional bandwidth from a master device on the network; and
   assigning data from a transmission to be transmitted in a total bandwidth allocation to the network device using a bandwidth assignment command including the additional bandwidth allocation and a first bandwidth allocation;
   wherein the bandwidth assignment command is a bandwidth replacement command and the network device releases the first bandwidth allocation prior to assigning data from a transmission to be transmitted in the total bandwidth allocation of the network device.

3. A method for adjusting a transmission rate of a transmission for a network device on a network comprising:
   receiving at the network device an allocation of additional bandwidth from a master device on the network; and
   assigning data from a transmission to be transmitted in a total bandwidth allocation to the network device including the additional bandwidth allocation and a first bandwidth allocation;
   receiving a robust transmission request from the master device instructing the network device to utilize a more robust transmission scheme when the unutilized bandwidth associated with the master device increases;
   receiving additional bandwidth from the master device; and
   adjusting the transmission scheme of the transmission to a more robust transmission scheme to utilize the additional bandwidth allocated to the network device.

4. A method for a master device on a network to allocate bandwidth to network devices associated with the master device on the network comprising:
   receiving a request for bandwidth from a first network device;
   determining whether the master device has sufficient unutilized bandwidth allocated to it such that the master device could allocate the bandwidth to the first network device requesting the bandwidth;
   sending a reduce bandwidth request to the network devices associated with the master device on the network where the unutilized bandwidth allocated to the master device is insufficient to allocate the bandwidth requested by the first network device;
   receiving at least one bandwidth allocation from at least one second network devices on the network; and
   allocating bandwidth to the first network device from the bandwidth allocations to the master device received from the at least one second network devices on the network.

5. The method of claim 4, wherein allocating bandwidth to the first network device includes allocating of an additional timeslot for data transmission.

6. The method of claim 4, further comprising:
   allocating bandwidth to the first network device from the unutilized bandwidth allocated to the master device where the unutilized bandwidth allocated to the master device is sufficient to allocate the bandwidth requested by the first network device.

7. The method of claim 4, further comprising:
   maintaining a list of transmissions comprising:
   a list of reduced-rate transmissions indicating which transmissions have reduced transmissions rates due to reduced bandwidth allocations; and
   a list of robust transmissions indicating which transmissions have full or excess bandwidth allocations.
   allocating excess bandwidth to transmissions on the list of reduced-rate transmission and to transmissions on the list of robust transmission only where the list of reduced-rate transmissions is empty.

8. The method of claim 4, wherein the allocation of the bandwidth further comprises:
   dividing the bandwidth into two or more smaller bandwidths; and allocating the two or more smaller bandwidths to the first network device.

9. The method of claim 4, wherein the allocating the bandwidth further comprises:
   allocating at least one excess bandwidth to the first network device than needed for a current transmission rate where the master device has an excess of unutilized bandwidth; and
   sending a robust transmission request to the network device instructing the first network device to transmit utilizing a more robust modulation scheme.

10. The method of claim 9, further comprising: receiving a bandwidth request from a new transmission;
    sending a reduce bandwidth request to the at least one second network devices associated with the master device on the network in order to recover the at least one excess bandwidth allocated to the at least one second network devices;
    receiving the at least one excess bandwidth from the at least one second network devices to which the at least one excess bandwidth was allocated; and
    allocating at least a portion of the at least one excess bandwidth to the new transmission.

11. The method of claim 9, wherein the sending a reduce bandwidth request further comprises:
    sending the reduce bandwidth request first to the at least one second network devices associated with the master device that have a lowest priority transmission;
    determining if at least one excess bandwidth has been received from the at least one second network devices associated with the master device that have a lowest priority transmission; and
    sending the reduce bandwidth request to at least one second network devices associated with the master device that having a next lowest priority transmission.

12. A method for a first master device on a network to allocate bandwidth to network devices associated with the first master device on the network comprising:

receiving a request for bandwidth from a network device associated with the first master device;

requesting additional bandwidth from a second master device on the network when the first master device does not have sufficient bandwidth allocation to allocate the requested bandwidth to the network device;

receiving additional bandwidth from the second master device on the network; and allocating the additional bandwidth to the network device from which the request for bandwidth was received.

13. The method of claim 12, wherein the allocation the additional bandwidth to the network device includes allocating an additional timeslot for data transmission.

14. The method of claim 12, further comprising:

receiving at the first master device a bandwidth reduction request from the second master device;

sending a reduce bandwidth request to the network devices associated with the first master device on the network;

receiving bandwidth allocations from the network devices associated with the first master device on the network; and allocating bandwidth to the second master device.

15. The method of claim 12, further comprising:

sending a reduce bandwidth request to the network devices associated with the first master device on the network when the second master device did not have sufficient bandwidth to allocate to the first master device.

16. A shared network having fair and flexible bandwidth management comprising;

a plurality of master devices, wherein each master device is allocated a portion of a total amount of bandwidth available on the shared network; and at least one transmitter device associated with each of the plurality of master devices, wherein each transmitter is assigned bandwidth for a transmission of a data stream from a selected one of the plurality of master devices that is associated with the transmitter;

wherein each of the plurality of master devices coordinates with the other master devices the control over the use of the total amount of bandwidth available.

17. The shared network having fair and flexible bandwidth management of claim 16 wherein the plurality master devices control the assignment of the bandwidth for the transmission of the data streams such that when the shared network has a predetermined amount of the bandwidth utilized with transmission of the data streams, the assigned bandwidth for at least one of the transmitters is reduced.

18. The shared network having fair and flexible bandwidth management of claim 16 wherein the plurality master devices control the assignment of the bandwidth for the transmission of the data streams such that when the shared network has a predetermined amount of the bandwidth unutilized with transmission of the data streams, the assigned bandwidth for at least one of the transmitters is increased.

19. The shared network having fair and flexible bandwidth management of claim 16 wherein at least one of the transmitters utilizes a more robust transmission scheme in response to receiving additional bandwidth allocation from one of the master devices.

20. The shared network having fair and flexible bandwidth management of claim 19 wherein the more robust transmission scheme is one of the group consisting of a more robust modulation scheme, a more robust error correction code and repeated transmission of the data stream.

21. The shared network having fair and flexible bandwidth management of claim 16 wherein one of the master devices assigns bandwidth to one of the transmitter devices in response to a request from the transmitter.

22. The shared network having fair and flexible bandwidth management of claim 16 wherein upon a need for additional bandwidth, one of the master devices requests at least one transmitter device to release bandwidth.

23. The shared network having fair and flexible bandwidth management of claim 16 wherein upon a need for additional bandwidth, one of the master devices requests at least one other master device to release bandwidth.

24. The shared network having fair and flexible bandwidth management of claim 16 wherein when one of the master devices requires additional bandwidth and the master device requiring additional bandwidth currently has less than the portion of allocated bandwidth for the master device, the master device repeatedly sends a bandwidth reduction request to at least one other master device until receiving the additional bandwidth from the other master device.

25. The shared network having fair and flexible bandwidth management of claim 16 wherein the portion of a total amount of bandwidth available on the shared network for each master device is substantially equal for each master device on the shared network.

26. The shared network having fair and flexible bandwidth management of claim 16 wherein one of the master devices compares the amount of bandwidth the master device is currently using to the amount of bandwidth allocated to the master device upon receipt of a bandwidth reduction request from one of the other master devices.

27. The shared network having fair and flexible bandwidth management of claim 26 upon receipt of the bandwidth reduction request, the master device that received the bandwidth reduction request releases a portion of the bandwidth currently being used.

28. The shared network having fair and flexible bandwidth management of claim 16 wherein upon receipt of a first bandwidth reduction request a transmitter sending a robust transmission will reduce a rate of transmission to a normal transmission rate.

29. The shared network having fair and flexible bandwidth management of claim 28 wherein upon receipt of a second bandwidth reduction request the transmitter the transmission at the normal transmission rate will reduce the transmission rate to a reduced transmission rate.

30. The shared network having fair and flexible bandwidth management of claim 29 wherein upon receipt of a third bandwidth reduction request the transmitter the transmission at the reduced transmission rate will continue to transmit at the reduce, transmission rate.

31. The shared network having fair and flexible bandwidth management of claim 16 wherein upon receipt of additional bandwidth from the master device, a transmitter sending a data stream at a reduced rate will start transmitting the data stream at an increased rate of transmission.

32. The shared network having fair and flexible bandwidth management of claim 16 wherein upon receipt of additional bandwidth from the master device, a transmitter sending a data stream at an original rate will apply a more robust transmission scheme to the data stream.

33. The shared network having fair and flexible bandwidth management of claim 16 wherein upon detection of noise interfering with an assigned bandwidth for a transmitter, the master device assigns additional bandwidth to the transmitter.

34. The shared network having fair and flexible bandwidth management of claim 16 wherein upon detection of noise interfering with an assigned bandwidth for a transmitter, the master device assigns an alternative bandwidth to the transmitter.

35. The shared network having fair and flexible bandwidth management of claim 16 wherein upon detection of noise interfering with an assigned bandwidth for a transmitter, the transmitter reduces at least one of the transmission rate and the transmission scheme.

36. The shared network having fair and flexible bandwidth management of claim 16 wherein a reassignment of bandwidth for a transmitter is performed without intermittence to a data stream sent by the transmitter.

* * * * *

UNITED STATES PATENT AND TRADEMARK OFFICE
CERTIFICATE OF CORRECTION

PATENT NO. : 7,630,401 B2
APPLICATION NO. : 11/271038
DATED : December 8, 2009
INVENTOR(S) : Ryuichi Iwamura It is certified that error appears in the above-identified patent and that said Letters Patent is hereby corrected as shown below:

On the Title Page, Item (54) Title:
Column 1, Title, delete "BANDWITH" and insert --BANDWIDTH--.
Column 1, line 1, delete "BANDWITH" and insert --BANDWIDTH--.
In the Claims:
Claim 7, column 22, line 22, delete "allocations." and insert --allocations,--.

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO.       : 7,630,401 B2                                          Page 1 of 1
APPLICATION NO.  : 11/271038
DATED            : December 8, 2009
INVENTOR(S)      : Ryuichi Iwamura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1058 days.

Signed and Sealed this

Second Day of November, 2010

David J. Kappos
*Director of the United States Patent and Trademark Office*